United States Patent
Ramanath et al.

(10) Patent No.: US 9,254,553 B2
(45) Date of Patent: *Feb. 9, 2016

(54) BONDED ABRASIVE ARTICLE AND METHOD OF FORMING

(71) Applicants: SAINT-GOBAIN ABRASIVES, INC., Worcester, MA (US); SAINT-GOBAIN ABRASIFS, Conflans-Sainte-Honorine (FR)

(72) Inventors: Srinivasan Ramanath, Holden, MA (US); Kenneth A. Saucier, Leicester, MA (US); Rachana Upadhyay, Shrewsbury, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,515

(22) Filed: Mar. 21, 2014

(65) Prior Publication Data
US 2014/0202085 A1    Jul. 24, 2014

Related U.S. Application Data

(63) Continuation of application No. 13/225,114, filed on Sep. 2, 2011, now Pat. No. 8,715,381.

(60) Provisional application No. 61/379,920, filed on Sep. 3, 2010.

(51) Int. Cl.
| | | |
|---|---|---|
| B24D 3/06 | (2006.01) | |
| B24D 3/10 | (2006.01) | |
| C09K 3/14 | (2006.01) | |

(52) U.S. Cl.
CPC .. *B24D 3/10* (2013.01); *B24D 3/06* (2013.01); *C09K 3/1409* (2013.01)

(58) Field of Classification Search
CPC ........................................................ B24D 3/06
See application file for complete search history.

(56) References Cited

U.S. PATENT DOCUMENTS

| | | | |
|---|---|---|---|
| 2,811,430 A | 10/1957 | Gregor et al. | |
| 2,892,811 A | 6/1959 | Irany | |
| 2,939,777 A | 6/1960 | Gregor et al. | |
| 2,940,841 A | 6/1960 | Gregor et al. | |
| 3,203,775 A | 8/1965 | Cantrell | |
| 3,510,994 A | 5/1970 | Amero et al. | |
| 3,535,832 A | 10/1970 | Amero | |
| 3,547,609 A | 12/1970 | Gerry | |
| 3,594,141 A | 7/1971 | Houston et al. | |
| 3,650,715 A | 3/1972 | Brushek et al. | |
| 3,664,819 A | 5/1972 | Sioui et al. | |
| 4,010,583 A | 3/1977 | Highberg | |
| 4,024,675 A | 5/1977 | Naidich et al. | |
| 4,042,347 A | 8/1977 | Sioui | |
| 4,063,909 A | 12/1977 | Mitchell | |
| 4,802,895 A | 2/1989 | Burnand et al. | |
| 4,923,490 A | 5/1990 | Johnson et al. | |
| 5,035,723 A | 7/1991 | Kalinowski et al. | |
| 5,048,235 A | 9/1991 | Smith | |
| 5,173,091 A | 12/1992 | Marek | |
| 5,221,294 A | 6/1993 | Carman et al. | |
| 5,385,591 A | 1/1995 | Ramanath et al. | |
| 5,429,648 A | 7/1995 | Wu | |
| 5,556,438 A | 9/1996 | Kardys et al. | |
| 5,637,123 A | 6/1997 | Ishizaki et al. | |
| 5,658,194 A | 8/1997 | Micheletti | |
| 5,738,696 A | 4/1998 | Wu | |
| 5,785,784 A | 7/1998 | Chesley et al. | |
| 5,912,217 A | 6/1999 | Sumiya et al. | |
| 5,932,508 A | 8/1999 | Armstrong et al. | |
| 6,012,977 A | 1/2000 | Yoshikawa et al. | |
| 6,019,668 A | 2/2000 | Ramanath et al. | |
| 6,056,795 A | 5/2000 | Ramanath et al. | |
| 6,063,148 A | 5/2000 | Fischbacher | |
| 6,093,092 A | 7/2000 | Ramanath et al. | |
| 6,102,789 A | 8/2000 | Ramanath et al. | |
| 6,220,933 B1 | 4/2001 | Shih et al. | |
| 6,485,532 B2 | 11/2002 | Andrews et al. | |
| 6,679,758 B2 | 1/2004 | Bright et al. | |
| 6,685,755 B2 | 2/2004 | Ramanath et al. | |
| 6,754,827 B1 | 6/2004 | Cane et al. | |
| 6,755,729 B2 | 6/2004 | Ramanath et al. | |
| 6,988,937 B2 | 1/2006 | Bonner et al. | |
| 7,007,382 B2 | 3/2006 | Mantel | |
| 7,033,408 B2 | 4/2006 | Fries et al. | |
| 7,074,247 B2 | 7/2006 | Tank et al. | |
| 7,077,723 B2 | 7/2006 | Bright et al. | |
| 7,144,307 B2 | 12/2006 | Schwartz et al. | |

(Continued)

FOREIGN PATENT DOCUMENTS

| | | |
|---|---|---|
| CN | 1046924 A | 11/1990 |
| CN | 1158097 A | 8/1997 |

(Continued)

OTHER PUBLICATIONS

Dai et al, "Effects of Alloying Additives on the Grinding Performance of Porous Wheels", Journal of Fuzhou University (Natural Science Edition), 37, 1, 80-85, 2009.

(Continued)

*Primary Examiner* — Pegah Parvini
(74) *Attorney, Agent, or Firm* — Abel Law Group, LLP; Joseph P Sullivan

(57) ABSTRACT

An abrasive article includes a body having abrasive grains contained within a bond material comprising a metal or metal alloy, wherein the body comprises a ratio of $V_{AG}/V_{BM}$ of at least about 1.3, wherein $V_{AG}$ is the volume percent of abrasive grains within the total volume of the body and $V_{BM}$ is the volume percent of bond material within the total volume of the body.

20 Claims, 6 Drawing Sheets

(56) References Cited

U.S. PATENT DOCUMENTS

| | | | |
|---|---|---|---|
| 7,275,980 B2 | 10/2007 | Bonner et al. | |
| 7,285,146 B2 | 10/2007 | Petersen | |
| 7,303,461 B1 | 12/2007 | Campomanes et al. | |
| 7,628,829 B2 | 12/2009 | Woo et al. | |
| 7,708,619 B2 | 5/2010 | Subramanian et al. | |
| 7,833,086 B2 | 11/2010 | Mielke | |
| 7,896,728 B2 | 3/2011 | Schwartz et al. | |
| 7,971,356 B2 | 7/2011 | Orobengoa Ortubay et al. | |
| 8,377,158 B2 | 2/2013 | Palmgren et al. | |
| 2002/0006768 A1 | 1/2002 | Wada et al. | |
| 2002/0016139 A1 | 2/2002 | Hirokawa et al. | |
| 2002/0066233 A1 | 6/2002 | McArdle et al. | |
| 2002/0095871 A1 | 7/2002 | McArdle et al. | |
| 2003/0097800 A1* | 5/2003 | Ramanath et al. | 51/309 |
| 2003/0178138 A1 | 9/2003 | Tsukagoshi et al. | |
| 2003/0194947 A1 | 10/2003 | Bright et al. | |
| 2005/0026553 A1 | 2/2005 | Bonner et al. | |
| 2005/0101225 A1 | 5/2005 | Bright et al. | |
| 2005/0129975 A1 | 6/2005 | Ihara | |
| 2005/0257430 A1 | 11/2005 | Fries et al. | |
| 2005/0260939 A1 | 11/2005 | Andrews et al. | |
| 2007/0275641 A1 | 11/2007 | Subramanian et al. | |
| 2008/0085660 A1 | 4/2008 | Orlhac | |
| 2008/0131216 A1 | 6/2008 | Sasu et al. | |
| 2009/0084042 A1 | 4/2009 | Ramanath et al. | |
| 2009/0093198 A1 | 4/2009 | Subramanian et al. | |
| 2009/0094831 A1 | 4/2009 | Schwartz et al. | |
| 2009/0104854 A1 | 4/2009 | Junker | |
| 2009/0156104 A1 | 6/2009 | Kim et al. | |
| 2010/0000158 A1 | 1/2010 | De Leeuw-Morrison et al. | |
| 2010/0000159 A1 | 1/2010 | Walia et al. | |
| 2010/0159806 A1 | 6/2010 | Wu et al. | |
| 2010/0190424 A1 | 7/2010 | Francois et al. | |
| 2010/0319269 A1 | 12/2010 | Erickson | |
| 2011/0143641 A1 | 6/2011 | Ramanath et al. | |
| 2011/0179646 A1 | 7/2011 | Barnat | |
| 2011/0284841 A1 | 11/2011 | Kondou | |
| 2011/0306276 A1 | 12/2011 | Gagliardi | |
| 2012/0040589 A1 | 2/2012 | Upadhyay et al. | |
| 2012/0055098 A1 | 3/2012 | Ramanath et al. | |
| 2012/0066982 A1 | 3/2012 | Ramanath et al. | |
| 2012/0192499 A1 | 8/2012 | Sung | |
| 2013/0000211 A1 | 1/2013 | Upadhyay et al. | |
| 2013/0174494 A1 | 7/2013 | Twersky et al. | |
| 2013/0219800 A1 | 8/2013 | Guiselin | |
| 2014/0057534 A1 | 2/2014 | Hajduk et al. | |
| 2014/0187123 A1 | 7/2014 | Ramanath et al. | |
| 2014/0187124 A1 | 7/2014 | Ramanath et al. | |
| 2014/0187125 A1 | 7/2014 | Ramanath et al. | |
| 2014/0298729 A1 | 10/2014 | Ramanath et al. | |

FOREIGN PATENT DOCUMENTS

| | | |
|---|---|---|
| CN | 1239451 A | 12/1999 |
| CN | 1332666 A | 1/2002 |
| CN | 1451054 A | 10/2003 |
| CN | 1589189 A | 3/2005 |
| CN | 101351305 A | 1/2009 |
| CN | 101450463 A | 6/2009 |
| CN | 101511542 A | 8/2009 |
| CN | 101636244 A | 1/2010 |
| EP | 0174546 A2 | 8/1985 |
| EP | 0198653 A1 | 10/1986 |
| GB | 485565 A | 5/1938 |
| GB | 516475 A | 1/1940 |
| GB | 1148596 A | 4/1969 |
| GB | 1598837 A | 9/1981 |
| JP | 51140289 A | 12/1976 |
| JP | 59182064 A | 10/1984 |
| JP | S61270074 A | 11/1986 |
| JP | S61270285 A | 11/1986 |
| JP | S61-293769 A | 12/1986 |
| JP | 63256364 A | 10/1988 |
| JP | 2088176 A | 3/1990 |
| JP | 3161273 A | 7/1991 |
| JP | 3190670 A | 8/1991 |
| JP | 3264263 A | 11/1991 |
| JP | 3281174 A | 12/1991 |
| JP | H06-344264 A | 12/1994 |
| JP | 07-1339 A | 1/1995 |
| JP | 07-211723 A | 8/1995 |
| JP | H08-133839 A | 5/1996 |
| JP | H08-206962 A | 8/1996 |
| JP | 10094967 A | 4/1998 |
| JP | 2000-317843 A | 11/2000 |
| JP | 2000-326236 A | 11/2000 |
| JP | 2001-062601 A | 3/2001 |
| JP | 2001-246560 A | 9/2001 |
| JP | 2002273661 A | 9/2002 |
| JP | 2002-370172 A | 12/2002 |
| JP | 2003-181765 A | 7/2003 |
| JP | 2004-291218 A | 10/2004 |
| JP | 2005-342836 A | 12/2005 |
| JP | 2006-082187 A | 3/2006 |
| JP | 2006-346824 A | 12/2006 |
| SU | 1227441 A1 | 4/1986 |
| WO | 98/24593 A1 | 6/1998 |
| WO | 03/045634 A1 | 6/2003 |
| WO | 03/086704 A1 | 10/2003 |
| WO | 2006/008258 A1 | 1/2006 |
| WO | 2012/031229 A2 | 3/2012 |
| WO | 2014/106156 A1 | 7/2014 |
| WO | 2014/106157 A1 | 7/2014 |
| WO | 2014/106159 | 7/2014 |
| WO | 2014/165447 A1 | 10/2014 |

OTHER PUBLICATIONS

Dai et al, "Experimental Study on Porous Metal Bonded Diamond Grinding Wheels (III)—Grinding Performance of Porous Wheels", Key Engineering Materials, 359-60, 48-52, 2008.

Matsumaru et al, "Fabrication of Porous Metal Bonded Diamond Grinding Wheels for Flat-Surface Nonomachining", MRS Bulletin, 26, 7, 544-6, 2001.

Tanaka, "Development of the Bridged and Pored Type of Metal Bond Diamond Wheel", Seimitsu Kogaku Kaishi/Journal of the Japan Society for Precision Engineering, 0912-0289, 1991.

Truong et al, "Scanning Electron Microscopic Study and Mechanical Property Examination of a Bond Bridge: Development of a Porous Metal Bonded Diamond Wheel", Journal of Materials Processing Technology (Netherlands), 89-90, 385-391, 1999.

Truong et al, "Study on the Toughening of Bond Bridge of Ni—Cu—Sn Alloy—Development of Porous Meta Bonded Diamond Wheel", Seimitsu Kogaku Kaishi/Journal of the Japan Society for Precision Engineering, 0912-0289, 1998.

International Search Report from PCT/US2011/050412 mailed Apr. 10, 2012.

International Search Report from PCT/US2011/050384 mailed Apr. 10, 2012.

International Search Report from PCT/US2013/078225 mailed May 1, 2014, 1 page.

International Search Report from PCT/US2013/078227 mailed Apr. 23, 2014, 1 page.

International Search Report from PCT/US2013/078231 mailed Apr. 24, 2014, 1 page.

International Search Report from PCT/US2014/032384 mailed Jul. 15, 2014, 1 page.

* cited by examiner

BONDED ABRASIVE ARTICLE AND METHOD OF FORMING

CROSS-REFERENCE TO RELATED APPLICATION(S)

This application claims priority under 35 U.S.C. §120 to and is a continuation of U.S. application Ser. No. 13/225,114 entitled "Bonded Abrasive Article and Method of Forming," by Srinivasan Ramanath, et al., filed Sep. 2, 2011, which in turn claims priority from U.S. Provisional Patent Application No. 61/379,920, filed Sep. 3, 2010, entitled "Bonded Abrasive Article and Method of Forming", naming inventors Srinivasan Ramanath, et al., which application is incorporated by reference herein in its entirety.

BACKGROUND

1. Field of the Disclosure

The following is directed bonded abrasive articles, and more particularly, bonded abrasive articles including abrasive grains contained within a bond material including a metal or metal alloy.

2. Description of the Related Art

Abrasives used in machining applications typically include bonded abrasive articles and coated abrasive articles. Coated abrasive articles are generally layered articles having a backing and an adhesive coat to fix abrasive grains to the backing, the most common example of which is sandpaper. Bonded abrasive tools consist of rigid, and typically monolithic, three-dimensional, abrasive composites in the form of wheels, discs, segments, mounted points, hones and other tool shapes, which can be mounted onto a machining apparatus, such as a grinding or polishing apparatus.

Bonded abrasive tools usually have at least two phases including abrasive grains and bond material. Certain bonded abrasive articles can have an additional phase in the form of porosity. Bonded abrasive tools can be manufactured in a variety of 'grades' and 'structures' that have been defined according to practice in the art by the relative hardness and density of the abrasive composite (grade) and by the volume percentage of abrasive grain, bond, and porosity within the composite (structure).

Some bonded abrasive tools may be particularly useful in grinding and shaping certain types of workpieces, including for example, metals, ceramics and crystalline materials, used in the electronics and optics industries. In other instances, certain bonded abrasive tools may be used in shaping of superabrasive materials for use in industrial applications. In the context of grinding and shaping certain workpieces with metal-bonded abrasive articles, generally the process involves a significant amount of time and labor directed to maintaining the bonded abrasive article. That is, generally, metal-bonded abrasive articles require regular truing and dressing operations to maintain the grinding capabilities of the abrasive article.

The industry continues to demand improved methods and articles capable of grinding.

SUMMARY

According to a first aspect, an abrasive article includes a body having abrasive grains contained within a bond material comprising a metal or metal alloy. The body comprises a ratio of $V_{AG}/V_{BM}$ of at least about 1.3, wherein $V_{AG}$ is the volume percent of abrasive grains within the total volume of the body and $V_{BM}$ is the volume percent of bond material within the total volume of the body.

According to another aspect, an abrasive article includes a body having abrasive grains contained within a bond material comprising a metal or metal alloy, wherein the body comprises a ratio of $V_P/V_{BM}$ of at least about 1.5, wherein $V_P$ is the volume percent of particulate material including abrasive grains and fillers within the total volume of the body and $V_{BM}$ is the volume percent of bond material within the total volume of the body. The bond material has an average fracture toughness ($K_{1c}$) of not greater about 4.0 MPa m$^{0.5}$.

In yet another aspect, an abrasive article includes a body having abrasive grains contained within a bond material comprising a metal or metal alloy, wherein the body comprises an active bond composition comprising at least about 1 vol % of an active bond composition of the total volume of the bond material. The body further includes a porosity of at least about 5 vol %, and wherein the bond material comprises an average fracture toughness ($K_{1c}$) of not greater about 4.0 MPa m$^{0.5}$.

In still another aspect, an abrasive article includes a body having abrasive grains contained within a bond material comprising a metal or metal alloy, wherein the body comprises a ratio of $V_P/V_{BM}$ of at least about 1.5, wherein $V_P$ is the volume percent of particulate material including abrasive grains and fillers within the total volume of the body and $V_{BM}$ is the volume percent of bond material within the total volume of the body. The body includes at least about 5 vol % porosity of the total volume of the body, wherein a majority of the porosity is interconnected porosity defining a network of interconnected pores extending through the volume of the body.

According to another aspect, an abrasive article includes a body having abrasive grains contained within a bond material comprising a metal or metal alloy, wherein the body comprises a ratio of $V_{AG}/V_{BM}$ of at least about 1.3, wherein $V_{AG}$ is the volume percent of abrasive grains within the total volume of the body and $V_{BM}$ is the volume percent of bond material within the total volume of the body. The body includes an active bond composition comprising at least 10 vol % of an active bond composition of the total volume of the bond material.

In yet another aspect, a method of forming an abrasive article includes forming a mixture including abrasive grains and bond material, wherein the bond material comprises a metal or metal alloy, and shaping the mixture to form a green article. The method further includes sintering the green article at a temperature to conduct liquid phase sintering and form an abrasive body including the abrasive grains contained within the bond material, wherein the body comprises a ratio of $V_P:V_{BM}$ of at least about 3:2, wherein $V_P$ is the volume percent of particulate material including abrasive grains and fillers within the total volume of the body and $V_{BM}$ is the volume percent of bond material within the total volume of the body.

Another aspect includes an abrasive article having a bonded abrasive body including abrasive grains contained within a bond material made of a metal or metal alloy, wherein the bond material comprises a composite material including a bond phase and a precipitated phase, the precipitated phase having a composition including at least one element of an active bond composition and at least one element of the bond material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
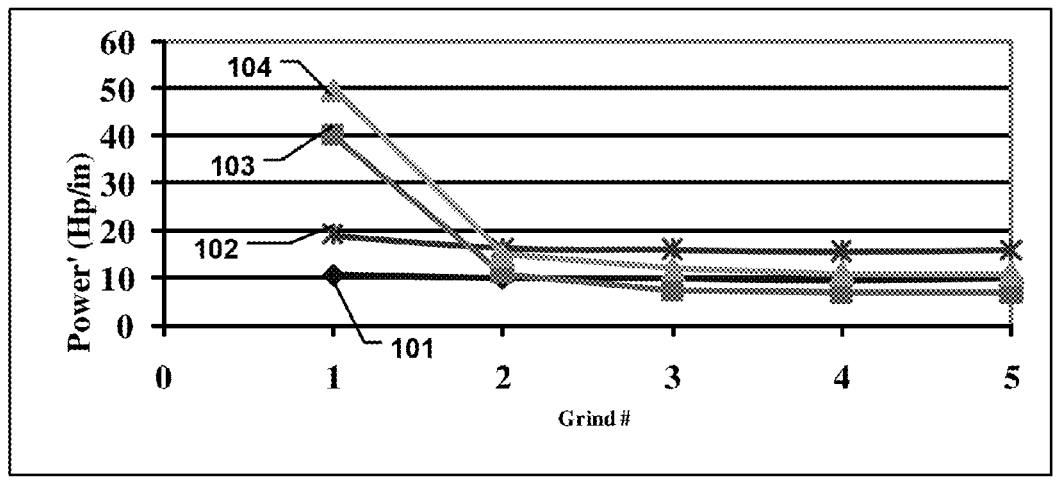
FIG. 1 includes a plot of grinding power (HP/in) versus number of grinding cycles for a bonded abrasive body according to an embodiment.

The following is generally directed to bonded abrasive articles incorporating abrasive grains within a three-dimensional matrix of material. Bonded abrasive articles utilize a volume of abrasive grains secured within a three-dimensional matrix of bond material. Moreover, the following includes description related to methods of forming such bonded abrasive articles and applications for such bonded abrasive articles.

In accordance with an embodiment, the process for forming an abrasive article can be initiated by forming a mixture containing abrasive grains and bond material. The abrasive grains can include a hard material. For example, the abrasive grains can have a Mohs hardness of at least about 7. In other abrasive bodies, the abrasive grains can have a Mohs hardness of at least 8, or even at least 9.

In particular instances, the abrasive grains can be made of an inorganic material. Suitable inorganic materials can include carbides, oxides, nitrides, borides, oxycarbides, oxyborides, oxynitrides, and a combination thereof. Particular, examples of abrasive grains include silicon carbide, boron carbide, alumina, zirconia, alumina-zirconia composite particles, silicon nitride, SiAlON, and titanium boride. In certain instances, the abrasive grains can include a superabrasive material, such as diamond, cubic boron nitride, and a combination thereof. In particular instances, the abrasive grains can consist essentially of diamond. In other embodiments, the abrasive grains can consist essentially of cubic boron nitride.

The abrasive grains can have an average grit size of not greater than about 1000 microns. In other embodiments, the abrasive grains can have an average grit size of not greater than about 750 microns, such as not greater than about 500 microns, not greater than about 250 microns, not greater than about 200 microns, or even not greater than about 150 microns. In particular instances, the abrasive grains of embodiments herein can have an average grit size, within a range between about 1 micron and about 1000 microns, such as between about 1 micron and 500 microns, or even between about 1 microns and 200 microns.

In further reference to the abrasive grains, the morphology of the abrasive grains can be described by an aspect ratio, which is a ratio between the dimensions of length to width. It will be appreciated that the length is the longest dimension of the abrasive grit and the width is the second longest dimension of a given abrasive grit. In accordance with embodiments herein, the abrasive grains can have an aspect ratio (length:width) of not greater than about 3:1 or even not greater than about 2:1. In particular instances, the abrasive grains can be essentially equiaxed, such that they have an aspect ratio of approximately 1:1.

The abrasive grains can include other features, including for example, a coating. The abrasive grains can be coated with a coating material which may be an inorganic material. Suitable inorganic materials can include a ceramic, a glass, a metal, a metal alloy, and a combination thereof. In particular instances, the abrasive grains can be electroplated with a metal material and, more particularly, a transition metal composition. Such coated abrasive grains may facilitate improved bonding (e.g., chemical bonding) between the abrasive grains and the bond material.

In certain instances, the mixture can include a particular distribution of abrasive grains. For example, the mixture can include a multi-modal distribution of grit sizes of abrasive grains, such that a particular distribution of fine, intermediate, and coarse grit sizes are present within the mixture. In one particular instance the mixture can include a bimodal distribution of abrasive grains including fine grains having a fine average grit size and coarse abrasive grains having a coarse average grit size, wherein the coarse average grit size is significantly greater than the fine average grit size. For instance, the coarse average grit size can be at least about 10% greater, at least about 20%, at least about 30%, or even at least about 50% greater than the fine average grit size (based on the fine abrasive grit size). It will be appreciated that the mixture can include other multi-modal distribution of abrasive grains, including for example, a tri-modal distribution or a quad-modal distribution.

It will also be appreciated that abrasive grains of the same composition can have various mechanical properties, including for example, friability. The mixture, and the final-formed bonded abrasive body, can incorporate a mixture of abrasive grains, which may be the same composition, but having varying mechanical properties or grades. For example, the mixture can include abrasive grains of a single composition, such that the mixture includes only diamond or cubic boron nitride. However, the diamond or cubic boron nitride can include a mixture of different grades of diamond or cubic boron nitride, such that the abrasive grains having varying grades and varying mechanical properties.

The abrasive grains can be provided in the mixture in an amount such that the finally-formed abrasive article contains a particular amount of abrasive grains. For example, the mixture can include a majority content (e.g., greater than 50 vol %) of abrasive grains.

In accordance with an embodiment, the bond material can be a metal or metal alloy material. For example, the bond material can include a powder composition including at least one transition metal element. In particular instances, the bond material can include a metal selected from the group including copper, tin, silver, molybdenum, zinc, tungsten, iron, nickel, antimony, and a combination thereof. In one particular embodiment, the bond material can be a metal alloy including copper and tin. The metal alloy of copper and tin can be a bronze material, which may be formed of a 60:40 by weight composition of copper and tin, respectively.

According to a particular embodiment, the metal alloy of copper and tin can include a certain content of copper, such that the final-formed bonded abrasive article has suitable mechanical characteristics and grinding performance. For example, the copper and tin metal alloy can include not greater than about 70% copper, such as not greater than about 65% copper, not greater than about 60% not greater than about 50% copper, not greater than about 45% copper, or even not greater than about 40% copper. In particular instances, the amount of copper is within a range between about 30% and about 65%, and more particularly, between about 40% and about 65%.

Certain metal alloys of copper and tin can have a minimum amount of tin. For example, the metal alloy can include at least about 30% tin of the total amount of the composition. In other instances, the amount of tin can be greater, such as at least about 35%, at least about 40%, at least about 45%, at least about 50%, at least about 60%, at least about 65%, or even at least about 75%. Certain bond materials can include a copper and tin metal alloy having an amount of tin within a range between about 30% and about 80%, between about 30% and about 70%, or even between about 35% and about 65%.

In an alternative embodiment, the bond material can be a tin-based material, wherein tin-based materials include metal and metal alloys comprising a majority content of tin versus other compounds present in the material. For example, the bond material can consist essentially of tin. Still, certain-tin-based bond materials may be used that include not greater than about 10% of other alloying materials, particularly metals.

The mixture can contain an equal portion of abrasive grains to bond. However, in certain embodiments, the mixture can be formed such that the amount of bond material can be less than the amount of abrasive grains within the mixture. Such a mixture facilitates a bonded abrasive article having certain properties, which are described in more detail herein.

In addition to the abrasive grains and bond material, the mixture can further include an active bond composition precursor. The active bond composition precursor includes a material, which can be added to the mixture that later facilitates a chemical reaction between certain components of the bonded abrasive body, including for example, particulate material (e.g., abrasive grains and/or fillers) and bond material. The active bond composition precursor can be added to the mixture in minor amounts, and particularly, in amounts less than the amount of the abrasive grains present within the mixture.

In accordance with an embodiment, the active bond composition precursor can include a composition including a metal or metal alloy. More particularly, the active bond composition precursor can include a composition or complex including hydrogen. For example, the active bond composition precursor can include a metal hydride, and more particularly, can include a material such as titanium hydride. In one embodiment, the active bond composition precursor consists essentially of titanium hydride.

The mixture generally includes a minor amount of the active bond composition precursor. For example, the mixture can include not greater than about 40 wt % of the active bond composition precursor of the total weight of the mixture. In other embodiments, the amount of the active bond composition precursor within the mixture can be less, such as not greater than about 35 wt %, not greater than about 30 wt %, not greater than about 28 wt %, not greater than about 26 wt %, not greater than about 23 wt %, not greater than about 18 wt %, not greater than about 15 wt %, not greater than about 12 wt %, or even not greater than about 10 wt %. In particular instances, the amount of active bond composition precursor within the mixture can be within a range between about 2 wt % and about 40 wt %, such as between about 4 wt % and about 35 wt %, between about 8 wt % and about 28 wt %, between about 10 wt % and about 28 wt %, or even between about 12 wt %, and about 26 wt %.

The mixture can further include a binder material. The binder material may be utilized to provide suitable strength during formation of the bonded abrasive article. Certain suitable binder materials can include an organic material. For example, the organic material can be a material such as a thermoset, thermoplastic, adhesive and a combination thereof. In one particular instance, the organic material of the binder material includes a material such as polyimides, polyamides, resins, aramids, epoxies, polyesters, polyurethanes, acetates, celluloses, and a combination thereof. In one embodiment, the mixture can include a binder material utilizing a combination of a thermoplastic material configured to cure at a particular temperature. In another embodiment, the binder material can include an adhesive material suitable for facilitating attachment between components of the mixture. The binder can be in the form of a liquid, including for example, an aqueous-based or non-aqueous-based compound.

Generally, the binder material can be present in a minor amount (by weight) within the mixture. For example, the binder can be present in amount significantly less than the amount of the abrasive grains, bond material, or the active bond composition precursor. For example, the mixture can include not greater than about 40 wt % of binder material for the total weight of the mixture. In other embodiments, the amount of binder material within the mixture can be less, such as not greater than about 35 wt %, not greater than about 30 wt %, not greater than about 28 wt %, not greater than about 26 wt %, not greater than about 23 wt %, not greater than about 18 wt %, not greater than about 15 wt %, not greater than about 12 wt %, or even not greater than about 10 wt %. In particular instances, the amount of binder material within the mixture can be within a range between about 2 wt % and about 40 wt %, such as between about 4 wt % and about 35 wt %, between about 8 wt % and about 28 wt %, between about 10 wt % and about 28 wt %, or even between about 12 wt % and about 26 wt %.

The mixture can further include a certain amount of fillers. The fillers can be a particulate material, which may be substituted for certain components within the mixture, including for example, the abrasive grains. Notably, the fillers can be a particulate material that may be incorporated in the mixture, wherein the fillers substantially maintain their original size and shape in the finally-formed bonded abrasive body. Examples of suitable fillers can include oxides, carbides, borides, silicides, nitrides, oxynitrides, oxycarbides, silicates, graphite, silicon, inter-metallics, ceramics, hollow-ceramics, fused silica, glass, glass-ceramics, hollow glass spheres, natural materials such as shells, and a combination thereof.

Notably, certain fillers can have a hardness that is less than the hardness of the abrasive grains. Additionally, the mixture can be formed such that the fillers are present in an amount of not greater than about 90 vol % of the total volume of the mixture. Volume percent is used to describe the content of fillers as fillers can have varying density depending upon the type of particulate, such as hollow spheres versus heavy particulate. In other embodiments, the amount of filler within the mixture can be not greater than about 80 vol %, such as not greater than about 70 vol %, not greater than about 60 vol %, not greater than about 50 vol %, not greater than about 40 vol %, not greater than about 30 vol %, or even not greater than about 20 vol %.

Certain forming processes may utilize a greater amount of filler material than the amount of abrasive grains. For example, nearly all of the abrasive grains can be substituted with one or more filler materials. In other instances, a majority content of the abrasive grains can be substituted with filler material. In other embodiments, a minor portion of the abrasive grains can be substituted with filler material.

Moreover, the fillers can have an average particulate size that is significantly less than the average grit size of the abrasive grains. For example, the average particulate size of the fillers can be at least about 5% less, such as at least about 10% less, such as at least about 15% less, at least about 20% less, or even at least about 25% less than the average grit size of the abrasive grains based on the average grit size of the average grit size of the abrasive grains.

In certain other embodiments, the fillers can have an average particulate size that is greater than the abrasive grains, particularly in the context of fillers that are hollow bodies.

In particular instances, the filler material can have a fracture toughness (KO of not greater than about 10 MPa m$^{0.5}$, as measured by a nano-indentation test via standardized test of ISO 14577 utilizing a diamond probe available from CSM Indentation Testers, Inc., Switzerland or similar companies. In other embodiments, the filler can have a fracture toughness (KO of not greater than about 9 MPa m$^{0.5}$, such as not greater than about 8 MPa m$^{0.5}$, or even not greater than about 7 MPa m$^{0.5}$. Still, the average fracture toughness of the fillers can be within a range between about 0.5 MPa m$^{0.5}$ about 10 MPa m$^{0.5}$, such as within a range between about 1 MPa m$^{0.5}$ about 9 MPa m$^{0.5}$, or even within a range between about 1 MPa m$^{0.5}$ about 7 MPa m$^{0.5}$.

After forming the mixture, the process of forming the bonded abrasive article continues by shearing the mixture such that it has proper rheological characteristics. For example, the mixture can be sheared until it has a particular viscosity, such as at least about 100 Centipoise, and can have a consistency that is semi-liquid (e.g., a mud-like consistency). In other instances, it could be of much lower viscosity such as a paste.

After shearing the mixture, the process can continue by forming agglomerates from the mixture. Process of forming agglomerates can initially include a process of drying the mixture. In particular the drying process may be conducted at a temperature suitable to cure an organic component (e.g., thermoset) within the binder contained within the mixture, and remove a portion of certain volatiles (e.g., moisture) within the mixture. Thus, upon suitable curing the organic material within the binder material, the mixture can have a hardened or semi-hardened form. Particularly suitable drying temperatures can be not greater than about 250° C., and more particularly, within a range between about 0° C. and about 250° C.

After drying the mixture at a suitable temperature, the process of forming agglomerates can continue by crushing the hardened form. After crushing the hardened form, the crushed particles include agglomerates of the components contained within the mixture, including the abrasive grains and bond material. The process of forming the agglomerates can then include sieving of the crushed particulate to obtain a suitable distribution of agglomerate sizes.

After forming the agglomerates, the process can continue by shaping the agglomerates into a desirable shape of the finally-formed bonded abrasive article. One suitable shaping process includes filling a mold with the agglomerated particles. After filling the mold, the agglomerates can be pressed to form a green (i.e., unsintered) body having the dimensions of the mold. In accordance with one embodiment, pressing can be conducted at a pressure of at least about 0.01 ton/in$^2$ of the area of the bonded abrasive article. In other embodiments, the pressure can be greater, such as on the order of at least about 0.1 tons/in$^2$, at least about 0.5 tons/in$^2$, at least about 1 ton/in$^2$, or even at least about 2 tons/in$^2$. In one particular embodiment pressing is completed at a pressure within a range between about 0.01 ton/in$^2$ and about 5 tons/in$^2$, or more particularly, within a range between about 0.5 tons/in$^2$ and about 3 tons/in$^2$.

After shaping the mixture to form the green article, the process can continue by treating the green article. Treating can include heat treating the green article, and particularly sintering of the green article. In one particular embodiment, treating includes liquid phase sintering to form the bonded abrasive body. Notably, liquid phase sintering includes forming a liquid phase of certain components of the green article, particularly, the bond material, such that at the sintering temperature at least a portion of the bond material is present in liquid phase and free-flowing. Notably, liquid phase sintering is not a process generally used for formation of bonded abrasives utilizing a metal bond material.

In accordance with an embodiment, treating the green article includes heating the green article to a liquid phase sintering temperature of at least 400° C. In other embodiments, the liquid phase sintering temperature can be greater, such as at least 500° C., at least about 650° C., at least about 800° C., or even at least about 900° C. In particular instances, the liquid phase sintering temperature can be within a range between about 400° C. and about 1100° C., such as between about 800° C., and about 1100° C., and more particularly, within a range between about 800° C. and 1050° C.

Treating, and particularly sintering, can be conducted for a particular duration. Sintering at the liquid phase sintering temperature can be conducted for a duration of at least about 10 minutes, at least about 20 minutes, at least about 30 minutes, or even at least about 40 minutes. In particular embodiments, the sintering at the liquid phase sintering temperature can last for a duration within a range between about 10 minutes and about 90 minutes, such as between about 10 minutes and 60 minutes, or even between about 15 minutes and about 45 minutes.

Treating the green article can further include conducting a liquid phase sintering process in a particular atmosphere. For example, the atmosphere can be a reduced pressure atmosphere having a pressure of not greater than about 10$^{-2}$ Torr. In other embodiments, the reduce pressure atmosphere can have a pressure of not greater than about 10$^{-3}$ Torr, not greater than about 10$^{-4}$ Torr, such as not greater than about 10$^{-5}$ Torr, or even not greater than about 10$^{-6}$ Torr. In particular instances, the reduced pressure atmosphere can be within a range between about 10$^{-2}$ Torr and about 10$^{-6}$ Torr.

Additionally, during treating the green article, and particularly during a liquid phase sintering process, the atmosphere can be a non-oxidizing (i.e., reducing) atmosphere. Suitable gaseous species for forming the reducing atmosphere can include hydrogen, nitrogen, noble gases, carbon monoxide, dissociated ammonia, and a combination thereof. In other embodiments, an inert atmosphere may be used during treating of the green article, to limit oxidation of the metal and metal alloy components.

After completing the treating process, a bonded abrasive article incorporating abrasive grains within a metal bond material is formed. In accordance with an embodiment, the abrasive article can have a body having particular features. For example, in accordance with one embodiment, the bonded abrasive body can have a significantly greater volume of abrasive grains than the volume of bond material within the body. The bonded abrasive body can have a ratio of $V_{AG}/V_{BM}$ of at least about 1.3, wherein $V_{AG}$ represents a volume percent of abrasive grains within the total volume of the bonded abrasive body, and $V_{BM}$ represents the volume percent of bond material within the total volume of the bonded abrasive body. In accordance with another embodiment, the ratio of $V_{AG}/V_{BM}$ can be at least about 1.5, such as at least about 1.7, at least about 2.0, at least about 2.1, at least about 2.2, or even at least about 2.5. In other embodiments, the bonded abrasive body can be formed such that the ratio of $V_{AG}/V_{BM}$ is within a range between about 1.3 and about 9.0, such as between about 1.3 and about 8.0, such as between about 1.5 and about 7.0, such as between about 1.5 and about 6.0, between about 2.0 and about 5.0, between about 2.0 and about 4.0, between about 2.1 and about 3.8, or even between about 2.2 and about 3.5.

In more particular terms, the bonded abrasive body can include at least about 30 vol % abrasive grains for the total volume of the bonded abrasive body. In other instances, the content of abrasive grains is greater, such as at least about 45 vol %, at least about 50 vol %, at least about 60 vol %, at least about 70 vol %, or even at least about 75 vol %. In particular embodiments, the bonded abrasive body comprises between about 30 vol % and about 90 vol %, such as between about 45 vol % and about 90 vol %, between about 50 vol % and about 85 vol %, or even between about 60 vol % and about 80 vol % abrasive grains for the total volume of the bonded abrasive body.

The bonded abrasive body can include not greater than about 45 vol % bond material for the total volume of the bonded abrasive body. According to certain embodiments, the content of bond material is less, such not greater than about 40 vol %, not greater than about 30 vol %, not greater than about 25 vol %, not greater than about 20 vol %, or even not greater than about 15 vol %. In particular embodiments, the bonded abrasive body comprises between about 5 vol % and about 45 vol %, such as between about 5 vol % and about 40 vol %, between about 5 vol % and about 30 vol %, or even between about 10 vol % and about 30 vol % bond material for the total volume of the bonded abrasive body.

In accordance with another embodiment, the bonded abrasive body herein can include a certain amount of porosity. For example, the bonded abrasive body can have at least 5 vol % porosity for the total volume of the bonded abrasive body. In other embodiments, the bonded abrasive body can have at least about 10 vol %, such as at least about 12 vol %, at least about 18 vol %, at least about 20 vol %, at least about 25 vol %, at least about 30 vol %, or even at least about 35 vol % porosity for the total volume of the body. Still, in other embodiments, the bonded abrasive body can include not greater than about 80 vol % porosity for the total volume of the body. In other articles, the bonded abrasive body can have not greater than about 70 vol %, not greater than about 60 vol %, 55 vol % porosity, such as not greater than about 50 vol % porosity, not greater than about 48 vol % porosity, not greater than about 44 vol % porosity, not greater than about 40 vol % porosity, or even not greater than about 35 vol % porosity for the total volume of the body. It will be appreciated that the porosity can fall within a range between any of the minimum and maximum values listed herein.

The bonded abrasive body can be formed such that a certain content of the porosity within the bonded abrasive body is interconnected porosity. Interconnected porosity defines a network of interconnected channels (i.e., pores) extending through the volume of the bonded abrasive body. For example, a majority of the porosity of the body can be interconnected porosity. In fact, in particular instances, the bonded abrasive body can be formed such that at least 60%, at least about 70%, at least about 80%, at least about 90%, or even at least about 95% of the porosity present within the bonded abrasive body is interconnected porosity. In certain instances, essentially all of the porosity present within the body is interconnected porosity. Accordingly, the bonded abrasive body can be defined by a continuous network of two phases, a solid phase defined by the bond and abrasive grains and a second continuous phase defined by the porosity extending between the solid phase throughout the bonded abrasive body.

In accordance with another embodiment, the bonded abrasive body can have a particular ratio of particulate material ($V_P$), which includes abrasive grains and fillers, as compared to the bond material ($V_{BM}$) for the total volume of the bonded abrasive body. It will be appreciated that the amounts of the particulate material and the bond material are measured in volume percent of the component as part of the total volume of the body. For example, the bonded abrasive body of embodiments herein can have a ratio ($V_P/V_{BM}$) of at least about 1.5. In other embodiments, the ratio ($V_P/V_{BM}$) can be at least about 1.7, at least about 2.0, at least about 2.2, at least about 2.5, or even at least about 2.8. In particular instances, the ratio ($V_P/V_{BM}$) can be within a range between 1.5 and about 9.0, such as between about 1.5 and 8.0, such as between about 1.5 and about 7.0, between about 1.7 and about 7.0, between about 1.7 and about 6.0, between about 1.7 and about 5.5, or even between about 2.0 and about 5.5. As such, the bonded abrasive body can incorporate a higher content of particulate material including fillers and abrasive grains than bond material.

According to one embodiment, the abrasive body can include an amount (vol %) of fillers that can be less than, equal to, or even greater than the amount (vol %) of abrasive grains present within the total volume of the bonded abrasive body. Certain abrasive articles can utilize not greater than about 75 vol % fillers for the total volume of the bonded abrasive body. According to certain embodiments, the content of fillers in the body can be not greater than about 50 vol %, not greater than about 40 vol %, not greater than about 30 vol %, not greater than about 20 vol %, or even not greater than about 15 vol %. In particular embodiments, the bonded abrasive body comprises between about 1 vol % and about 75 vol %, such as between about 1 vol % and about 50 vol %, between about 1 vol % and about 20 vol %, or even between about 1 vol % and about 15 vol % fillers for the total volume of the bonded abrasive body. In one instance, the bonded abrasive body can be essentially free of fillers.

The bonded abrasive bodies of embodiments herein can have a particular content of active bond composition. As will be appreciated the active bond composition can be a reaction product formed from a reaction between the active bond composition precursor and certain components of the bonded abrasive body, including for example, abrasive grains, fillers, and bond material. The active bond composition can facilitate chemical bonding between the particulates (e.g., abrasive grains or filler) within the body and the bond material, which may facilitate retention of particulates within the bond material.

In particular, the active bond composition can include distinct phases, which can be disposed in distinct regions of the bonded abrasive body. Moreover, the active bond composition can have a particular composition depending upon the location of the composition. For example, the active bond composition can include a precipitated phase and an interfacial phase. The precipitated phase can be present within the bond material and can be dispersed as a distinct phase throughout the volume of the bond material. The interfacial phase can be disposed at the interface between the particulate material (i.e., abrasive grains and/or fillers) and the bond material. The interfacial phase can extend around a majority of the surface area of the particulate material of the body. While not completely understood, it is theorized that the distinct phases and differences in the composition of the active bond composition are due to the forming processes, particularly liquid phase sintering.

Accordingly, the bond material can be a composite material including a bond phase and a precipitated phase, which are separate phases. The precipitated phase can be made of a composition including at least one element of the active bond composition and at least one element of the bond material. Notably, the precipitated phase can include at least one metal element originally provided in the mixture as the bond material. The precipitated phase can be a metal or metal alloy compound or complex. In particular embodiments, the precipitated phase can include a material selected from the group of materials consisting of titanium, vanadium, chromium, zirconium, hafnium, tungsten, and a combination thereof. In more particular instances, the precipitated phase includes titanium, and may consist essentially of titanium and tin.

The bond phase of the bond material can include a transition metal element, and particularly a metal element included in the original bond material used to form the mixture. As such, the bond phase can be formed of a material selected from the group of metals consisting of copper, tin, silver, molybdenum, zinc, tungsten, iron, nickel, antimony, and a combination thereof. In particular instances, the bond phase can include copper, and may be a copper-based compound or complex. In certain embodiments, the bond phase consists essentially of copper.

The interfacial phase can include at least one element of the active bond composition. Moreover, the interfacial phase can include at least one element of the particulate material. As such, the interfacial phase can be a compound or complex formed through a chemical reaction between the active bond composition and the particulate. Certain interfacial phase materials include carbides, oxides, nitrides, borides, oxynitrides, oxyborides, oxycarbides and a combination thereof. The interfacial phase can include a metal, and more particularly, may be a compound incorporating a metal, such as a metal carbide, metal nitride, metal oxide, metal oxynitride, metal oxyboride, or metal oxycarbide. According to one embodiment, the interfacial phase consists essentially of a material from the group of titanium carbide, titanium nitride, titanium boronitride, titanium aluminum oxide, and a combination thereof.

Moreover, the interfacial phase can have an average thickness of at least about 0.1 microns. However, and more particularly, the interfacial phase can have a varying thickness depending upon the size of the particulate material the interfacial phase overlies. For example, with regard to abrasive grains and/or fillers having an average size of less than 10 microns, the interfacial phase can have a thickness within a range between about 1% to 205 of the average size of the particulate. For particulate material having an average size within a range between about 10 microns and about 50 microns, the interfacial phase can have a thickness within a range between about 1% to about 10% of the average size of the particulate. For particulate material having an average size within a range between about 50 microns and about 500 microns, the interfacial phase can have a thickness within a range between about 0.5% to about 10% of the average size of the particulate. For particulate material having an average size of greater than about 500 microns, the interfacial phase can have a thickness within a range between about 0.1% to about 0.5% of the average size of the particulate.

Figure 8:
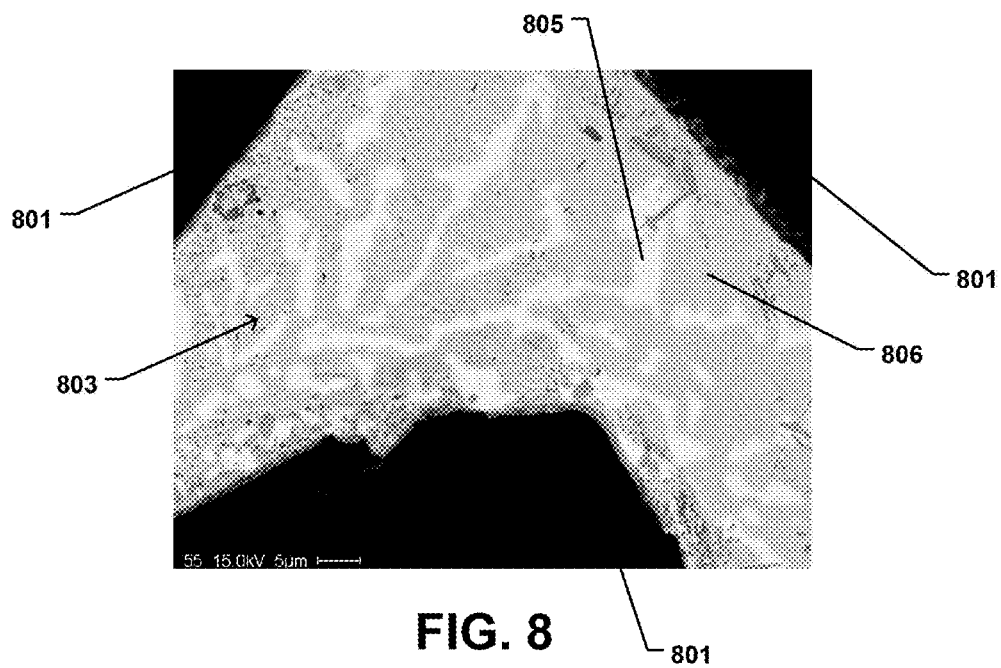
FIGS. 8-11 include magnified images of the microstructure of a bonded abrasive body according to an embodiment.

FIGS. 8-11 include magnified images of the microstructure of a bonded abrasive body in accordance with an embodiment. FIG. 8 includes a scanning electron microscope image (operated in backscatter mode) of a cross-section of a portion of a bonded abrasive body including abrasive grains 801 and bond material 803 extending between the abrasive grains 801. As illustrated, the bond material 803 includes two distinct phases of material, a precipitated phase 805 represented by a lighter color and extending through the volume of the bond material 803, and a bond phase 806 represented by a darker color and extending through the volume of the bond material 803.

Figure 9:
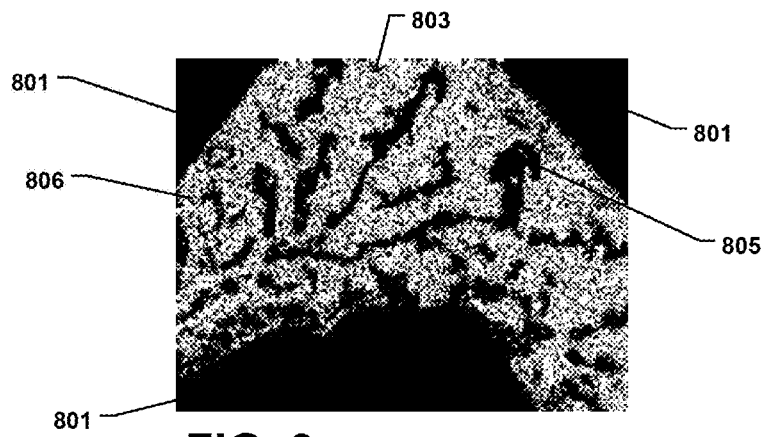
Figure 10:
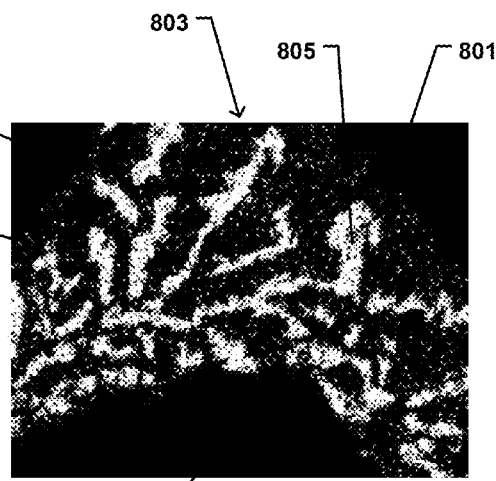
Figure 11:
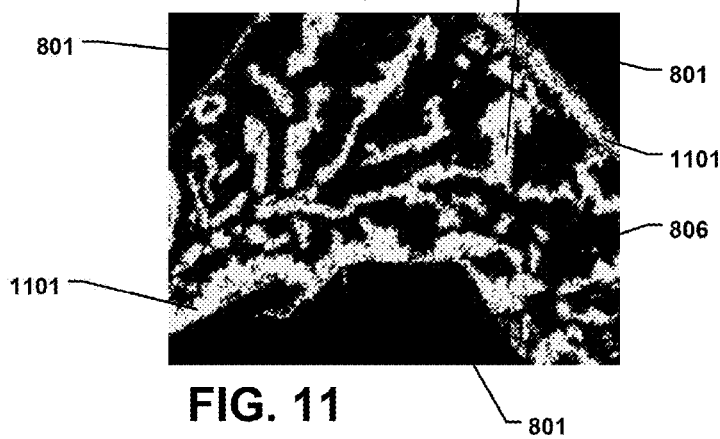

FIGS. 9-11 include magnified images of the same area of the bonded abrasive body of FIG. 8, using microprobe analysis to identify select elements present in certain regions of the body. FIG. 9 includes a microprobe image of the region of FIG. 8 in a mode set to identify regions high in copper, such that the lighter regions indicate regions where copper is present. According to an embodiment, the bond material 803 can include a metal alloy of copper and tin. According to a more particular embodiment, the bond phase 806 of the bond material 803, which is one of at least two distinct phases of the bond material 803, can have a greater amount of copper present than the precipitated phase 805.

FIG. 10 includes a magnified image of the region of FIGS. 8 and 9, using microprobe analysis to identify select elements present in certain regions of the bonded abrasive body. FIG. 10 uses a microprobe in a mode set to identify regions having tin present, such that the lighter regions indicate regions where tin is more prevalent. As illustrated, the precipitated phase 805 of the bond material 803 has a greater content of tin than the bond phase 806.

FIG. 11 includes a magnified image of the region of FIG. 8-10, using microprobe analysis. In particular, FIG. 11 uses a microprobe in a mode set to identify regions having titanium present, such that the lighter regions indicate regions where titanium is more prevalent. As illustrated, the precipitated phase 805 of the bond material 803 has a greater content of titanium than the bond phase 806. FIG. 11 also provides evidence of the interfacial phase 1101 at the interface of the abrasive grains 801 and the bond material 803. As evidenced by FIG. 11, the interfacial phase 1101 includes a particularly high content of titanium, indicating that the titanium of the active bond composition precursor may preferentially migrate to the interface of the particulate (i.e., abrasive grains 801) and chemically react with the abrasive grains to form an interracial phase compound as described herein.

FIGS. 8-11 provide evidence of an unexpected phenomenon. While it is not completely understood, the original bond material comprising copper and tin is separated during processing, which is theorized to be due to the liquid phase sintering process. The tin and copper become distinct phases; the precipitated phase 805 and the bond phase 806, respectively. Moreover, the tin preferentially combines with the titanium, present in the active bond composition precursor material to form the precipitated phase 805.

In accordance with an embodiment, the bonded abrasive body can include at least about 1 vol % of the active bond composition, which includes all phases of the active bond composition, such as the interfacial phase and the precipitate phase, for the total volume of the bond material. In other instances, the amount of active bond composition within the bond can be greater, such at least about 4 vol %, at least about 6 vol %, at least about 10 vol %, at least about 12 vol %, at least about 14 vol %, at least about 15 vol %, or even at least about 18 vol %. In particular instances, the bond material contains an amount of active bond composition within the range between about 1 vol % and about 40 vol %, such as between about 1 vol % and 30 vol %, between about 1 vol % and about 25 vol %, between about 4 vol % and about 25 vol %, or between about 6 vol % and about 25 vol %. In some instances, the amount of active bond composition is within a range between about 10 vol % and about 30 vol %, between about 10 vol % and about 25 vol %, or even between about 12 vol % and about 20 vol % of the total volume of the bond material.

The bonded abrasive body can be formed such that the bond material can have a particular fracture toughness ($K_{1c}$). The toughness of the bond material may be measured via a micro-indentation test or nano-indentation test. Micro-indentation testing measures the fracture toughness through a principle of generating cracks on a polished sample through loading an indentor at a particular location within the material, including for example in the present instance, in the bond material. For example, a suitable micro-indentation test can be conducted according to the methods disclosed in "Indentation of Brittle materials", Microindentation Techniques in Materials Science and Engineering, ASTM STP 889, D. B. Marshall and B. R. Lawn pp 26-46. In accordance with an embodiment, the bonded abrasive body has a bond material having an average fracture toughness ($K_{1c}$) of not greater than about 4.0 MPa m$^{0.5}$. In other embodiments, the average fracture toughness ($K_{1c}$) of the bond material can be not greater about 3.75 MPa m$^{0.5}$, such as not greater about 3.5 MPa m$^{0.5}$, not greater about 3.25 MPa m$^{0.5}$, not greater about 3.0 MPa m$^{0.5}$, not greater about 2.8 MPa m$^{0.5}$, or even not greater about 2.5 MPa m$^{0.5}$. The average fracture toughness of the bond material can be within a range between about 0.6 MPa m$^{0.5}$ about 4.0 MPa m$^{0.5}$, such as within a range between about 0.6 MPa m$^{0.5}$ about 3.5 MPa m$^{0.5}$, or even within a range between about 0.6 MPa m$^{0.5}$ about 3.0 MPa m$^{0.5}$.

The abrasive articles of the embodiments herein may have particular properties. For example, the bonded abrasive body can have a modulus of rupture (MOR) of at least about 2000 psi, such as at least about 4000 psi, and more particularly, at least about 6000 psi.

The bonded abrasive bodies of the embodiments herein demonstrate particular properties when used in certain grinding operations. In particular, the bonded abrasive wheels can be used in non-dressed grinding operations, wherein the bonded abrasive body does not require a dressing operation after the body has undergone a truing operation. Traditionally, truing operations are completed to give the abrasive body a desired contour and shape. After truing, the abrasive body is dressed, typically with an equally hard or harder abrasive element to remove worn grit and expose new abrasive grains Dressing is a time consuming and necessary process for conventional abrasive articles to ensure proper operation of the abrasive article. The bonded abrasive bodies of the embodiments herein have been found to require significantly less dressing during use and have performance parameters that are significantly improved over conventional abrasive articles.

For example, in one embodiment, during a non-dressed grinding operation, the bonded abrasive body of an embodiment, can have a power variance of not greater than about 40%, wherein power variance is described by the equation [(Po−Pn)/Po]×100%. Po represents the grinding power (Hp or Hp/in) to grind a workpiece with the bonded abrasive body at an initial grinding cycle and Pn represents the grinding power (Hp or Hp/in) to grind the workpiece for a n$^{th}$ grinding cycle, wherein n≥4. Accordingly, the power variance measures the change in grinding power from an initial grinding cycle to a subsequent grinding cycle, wherein at least 4 grinding cycles are undertaken.

In particular, the grinding cycles can be completed in a consecutive manner, which means no truing or dressing operations are conducted on the bonded abrasive article between the grinding cycles. The bonded abrasive bodies of the embodiments herein can have a power variance of not greater than about 25% during certain grinding operations. In still other embodiments, the power variance of the bonded abrasive body can be not greater than about 20%, such as not greater than about 15%, or even not greater than about 12%. The power variance of certain abrasive bodies can be within a range between about 1% and about 40%, such as between about 1% and about 20%, or even between about 1% and about 12%.

In further reference to the power variance, it will be noted that the change in grinding power between the initial grinding cycle (Po) and the grinding power used to grind the workpiece at an nth grinding cycle (Pn) can be measured over a number of grinding cycles wherein "n" is greater than or equal to 4. In other instances, "n" can be greater than or equal to 6 (i.e., at least 6 grinding cycles), greater than or equal to 10, or even greater than or equal to 12. Moreover, it will be appreciated that the nth grinding cycle can represent consecutive grinding cycles, wherein dressing is not completed on the abrasive article between the grinding cycles.

In accordance with an embodiment, the bonded abrasive body can be used in grinding operations, wherein the material removal rate (MRR') is at least about 1.0 in$^3$/min/in [10 mm$^3$/sec/mm]. In other embodiments, a grinding operation using a bonded abrasive body of embodiments herein, can be conducted at a material removal rate of at least about 4.0 in$^3$/min/in [40 mm$^3$/sec/mm], such as at least about 6.0 in$^3$/min/in [60 mm$^3$/sec/mm], at least about 7.0 in$^3$/min/in [70 mm$^3$/sec/mm], or even at least about 8.0 in$^3$/min/in [80 mm$^3$/sec/mm]. Certain grinding operations utilizing the bonded abrasive bodies of embodiments herein can be conducted at a material removal rate (MRR') within a range between about 1.0 in$^3$/min/in [10 mm$^3$/sec/mm] and about 20 in$^3$/min/in [200 mm$^3$/sec/mm], within a range between about 5.0 in$^3$/min/in [50 mm$^3$/sec/mm] and about 18 in$^3$/min/in [180 mm$^3$/sec/mm], within a range between about 6.0 in$^3$/min/in [60 mm$^3$/sec/mm] and about 16 in$^3$/min/in [160 mm$^3$/sec/mm] or even within a range between about 7.0 in$^3$/min/in [70 mm$^3$/sec/mm] and about 14 in$^3$/min/in [140 mm$^3$/sec/mm].

Moreover, the bonded abrasive body can be utilized in grinding operations wherein the bonded abrasive body is rotated at particular surface speeds. Surface speed refers to the speed of the wheel at the point of contact with the work piece. For example, the bonded abrasive body can be rotated at a speed of at least 1500 surface feet per minute (sfpm), such as at least about 1800, such as at least about 2000 sfpm, at least about 2500 sfpm, at least about 5000 sfpm, or even at least 10000 sfpm. In particular instances, the bonded abrasive body can be rotated at a speed within a range between about 2000 sfpm and about 15000 sfpm, such as between about 2000 sfpm and 12000 sfpm.

The bonded abrasive body may be suitable for use in various grinding operations including for example plunge grinding operations, creep feed grinding operations, peel grinding operations, flute grinding operations, and the like. In one particular instance, the bonded abrasive body is suitable for use in end mill grinding applications. In other instances, the bonded abrasive body may be useful in thinning of hard and brittle workpieces, including for example, sapphire and quartz materials.

Furthermore, the bonded abrasive bodies of embodiments herein may be utilized in grinding operations, wherein after grinding, the workpiece has an average surface roughness (Ra) that is not greater than about 50 microinches (about 1.25 microns). In other instances, the average surface roughness of the workpiece can be not greater than about 40 microinches (about 1 micron), or even not greater than about 30 microinches (about 0.75 microns).

In other embodiments, during grinding with bonded abrasive articles of embodiments herein, the average surface roughness variance for at least three consecutive grinding operations can be not greater than about 35%. It should be noted that consecutive grinding operations are operations wherein a truing operation is not conducted between each of the grinding operations. The variance in the average surface roughness can be calculated as a standard deviation of the measured average surface roughness (Ra) of the workpiece at each of the locations on the workpiece, where each separate grinding operation is conducted. In accordance with certain embodiments, the average surface roughness variance for at least three consecutive grinding operations can be not greater than about 25%, not greater than about 20%, not greater than about 15%, not greater than about 10%, or even not greater than about 5%.

In accordance with other embodiments, the bonded abrasive article can have a G-ratio of at least about 1200. The G-ratio is the volume of material removed from the workpiece divided by the volume of material lost from the bonded abrasive body through wear. In accordance with another embodiment, the bonded abrasive body can have a G-ratio of at least about 1300, such as at least about 1400, at least about 1500, at least about 1600, at least about 1700, or even at least about 1800. In certain instances, the G-ratio of the bonded abrasive body can be within a range between about 1200 and about 2500, such as between about 1200 and about 2300, or even between about 1400 and about 2300. The G-ratio values noted herein can be achieved at the material removal rates noted herein. Moreover, the G-ratio values described can be achieved on a variety of workpiece material types described herein.

In other terms, the bonded abrasive article can have a G-ratio that is significantly improved over conventional abrasive articles, particularly metal-bonded abrasive articles. For instance, the G-ratio of the bonded abrasive bodies according to embodiments herein can be at least about 5% greater than the G-ratio of a conventional abrasive article. In other instances, the improvement in G-ratio can be greater, such as at least about 10%, at least about 15%, at least about 20%, at least about 25%, or even at least about 30%. Particular embodiments of the bonded abrasive article demonstrate an increase in G-ratio as compared to a conventional bonded abrasive within a range between about 5% and about 200%, between about 5% and about 150%, between about 5% and about 125%, between about 5% and about 100%, between about 10% and about 75% or even between about 10% and about 60%.

Certain bonded abrasive bodies demonstrate an initial grinding power that is sufficiently close to a steady state grinding power. Generally, the steady state grinding power is significantly different from an initial grinding power for conventional metal-bonded abrasive articles. As such, the increase in the grinding power from an initial grinding power is particularly low for the bonded abrasive bodies of embodiments herein as compared to conventional metal-bonded abrasive articles. For example, the bonded abrasive bodies of the embodiments herein can have an increase in the initial grinding power of not greater than about 40% as defined by the equation $[(P_n-P_o)/P_o] \times 100\%$. In the equation, Po represents the initial grinding power (Hp or Hp/in) to grind the workpiece with the bonded abrasive body at an initial grinding cycle and Pn represents the grinding power (Hp or Hp/in) to grind the workpiece with the bonded abrasive body at a $n^{th}$ grinding cycle, wherein n≥16. It will be appreciated that the grinding cycles can be consecutive grinding cycles, wherein no truing or dressing of the bonded abrasive body is conducted.

According to one embodiment, during a grinding operation using the bonded abrasive article of embodiments herein, the increase in the initial grinding power is not greater than about 35%, such as not greater than about 30%, not greater than about 25%, not greater than about 20%, not greater than about 18%, not greater than about 15%, not greater than about 12%, not greater than about 10%, or even not greater than about 8%. In particular instances, the bonded abrasive body is capable of conducting grinding operations wherein the increase in the initial grinding power can be within a range between about 0.1% and about 40%, such as within a range between about 0.1% and about 30%, within a range between about 1% and about 15%, within a range between about 1% and about 12%, or even within a range between about 1% and about 8%.

In other embodiments, the bonded abrasive bodies demonstrate an increase in the initial grinding power of not greater than about 10% for a grinding time of at least 400 seconds at a minimum feed rate of about 3 inches/min. The increase in initial grinding power can be defined by the equation $[(P_{400}-P_o)/P_o] \times 100\%$, wherein Po represents the initial grinding power (Hp or Hp/in) to initially grind the workpiece with the bonded abrasive body at a first grinding cycle and $P_{400}$ represents the grinding power (Hp or Hp/in) to grind the workpiece with the bonded abrasive body after 400 seconds of grinding. In certain other grinding operations, the bonded abrasive body can have an increase in the initial grinding power of not greater than about 8%, such as not greater than about 6%, such as not greater than about 4%, or even not greater than about 2% for a grinding time of at least 400 seconds at a minimum feed rate of about 3 inches/min. In particular grinding applications, the bonded abrasive body demonstrates an increase in the initial grinding power within a range between about 0.1% and about 10%, such as between about 0.1% and about 8%, such as between about 0.1% and about 6%, or even between about 0.1% and about 4%, for a grinding time of at least 400 seconds at a minimum feed rate of about 3 inches/min.

The bonded abrasive bodies of embodiments herein can have a particular grinding performance, wherein the increase in initial grinding power is not greater than about 20% for a grinding time of at least about 800 seconds at a minimum feed rate of at least 3 inches/min. The increase in initial grinding power for such applications can be defined by the equation $[(P_{800}-P_o)/P_o] \times 100\%$, wherein Po represents the initial grinding power (Hp or Hp/in) to initially grind the workpiece with the bonded abrasive body at a first grinding cycle and $P_{800}$ represents the grinding power (Hp or Hp/in) to grind the workpiece with the bonded abrasive body after 800 seconds of grinding. Still, for certain bonded abrasive articles of embodiments herein, the increase in initial grinding power can be less, such as not greater than about 15%, not greater than about 10%, or even not greater than about 8% over a time of at least 800 seconds at a minimum feed rate of 3 inches/min. The bonded abrasive bodies herein can have an increase in the initial grinding power within a range between about 0.1% and about 20%, such as between about 0.1% and about 18%, such as between about 0.1% and about 15%, or even between about 0.1% and about 8%, for a grinding time of at least 800 seconds at a minimum feed rate of about 3 inches/min. Such properties may be particularly suitable for functioning of the bonded abrasive body when grinding hard or superhard workpieces.

In accordance with another embodiment, the bonded abrasive body can have a limited increase in initial grinding power for a grinding time of at least 800 seconds at a minimum feed rate of at least about 6 inches/min. For example, the increase in initial grinding power can be not greater than about 20%, such as not greater than about 15%, not greater than about 12%, or even not greater than about 10%, for a grinding time of at least 800 seconds at a minimum feed rate of about 6 inches/min. Such properties may be particularly suitable for functioning of the bonded abrasive body when grinding hard or superhard workpieces.

The bonded abrasive bodies of the embodiments herein may be suitable for grinding certain workpieces, such as particularly hard workpieces. For example, workpieces can have an average Vickers hardness of at least 5 GPa. In other instances, the average Vickers hardness of the workpieces can be at least about 10 GPa or even at least about 15 GPa.

The workpieces can be made of metals, metal alloys, nitrides, borides, carbides, oxides, oxynitrites, oxyborates, oxycarbides, in a combination thereof. In particular instances, the workpieces can be metal carbides, including for example, tungsten carbide. In exemplary conditions where grinding is conducted on workpieces made of tungsten carbide, the amount of cobalt within the tungsten carbide workpiece can be within a range between about 5% and about 12% by weight.

In conducting certain grinding operations, for example, on particularly hard materials, the bonded abrasive body can be operated at a rate of at least 1800 sfpm. In other instances, the bonded abrasive body can be rotated at a rate of at least 1900 sfpm, at least about 2200 sfpm, or even at least 2350 sfpm. In particular instances, the bonded abrasive body can be rotated at a rate within a range between about 1800 sfpm and about 3100 sfpm, more particularly, within a range between about 1900 sfpm and about 2350 sfpm during grinding operations.

Additionally, the bonded abrasive articles of embodiments herein are suitable for certain grinding operations, such as, for example, on particularly hard workpieces at certain feed rates. For example, the feed rate can be at least about 2 inches/min. In other instances, the feed rate can be greater, such as at least about 3 inches/min, at least about 3.5 inches/min, or at least about 4 inches/min. Particular embodiments may utilize the bonded abrasive body in a grinding operation wherein the feed rate is within a range between about 2 inches/min and about 10 inches/min, such as between about 3 inches/min and about 8 inches/min.

In yet another embodiment, the bonded abrasive body can be used in a grinding operation wherein after truing the bonded abrasive body with an abrasive truing wheel, the bonded abrasive body is capable of grinding a workpiece having an average Vickers hardness of at least 5 GPa for at least 17 consecutive grinding cycles without exceeding the maximum spindle power of the grinding machine. As such, the bonded abrasive bodies demonstrate an improved working lifetime particularly in the context of grinding workpieces of hard material. In fact, the bonded abrasive body is capable of conducting at least about 20 consecutive grinding cycles, at least about 25 consecutive grinding cycles, or at least about 30 consecutive grinding cycles before a truing operation is utilized. It will be appreciated that reference to consecutive grinding cycles is reference to grinding cycles conducted in a continuous manner without truing or dressing of the bonded abrasive body between grinding cycles.

In comparison of the bonded abrasive bodies of embodiments herein to conventional bonded abrasive bodies, generally, conventional bonded abrasive articles conduct not greater than about 16 consecutive grinding cycles on comparatively hard workpieces before requiring a truing operation for resharpening and resurfacing. As such, the bonded abrasive bodies of embodiments herein demonstrate an improvement of operable grinding time over conventional metal-bonded, bonded abrasives, as measured by the number of consecutive grinding cycles conducted before a truing operation is necessary or the grinding power exceeds the power capabilities of the grinding machine.

Another noteworthy improvement in grinding performance as measured in the industry is parts/dress, which is a measure of the number of parts that can be machined by a particular abrasive article before the abrasive article requires dressing to maintain performance. According to one embodiment, the bonded abrasive bodies of the embodiments herein can have an increase in grinding efficiency on a workpiece, as measured by parts/dress, of at least about 10% compared to a conventional metal-bonded abrasive article. According to another embodiment, the increase in grinding efficiency is at least about 20%, such as at least about 30%, at least about 40%, or even at least about 50% as compared to conventional metal-bonded abrasive articles. Notably, such conventional metal-bonded abrasive articles can include state of the art articles such as G-Force and Spector brand abrasive articles available from Saint-Gobain Corporation. In particular instances, the increase in grinding efficiency as measured by parts/dress can be within a range between about 10% and about 200%, such as on the order of between about 20% and about 200%, between about 50% and about 200%, or even between about 50% and about 150%. It will be appreciated, that such improvements can be achieved on workpieces described herein under the grinding conditions described herein.

Additionally, the bonded abrasive articles of embodiments herein can have an improvement in grinding performance as measured in the industry by wear rate, which is a measure of the wear an abrasive article experiences during grinding. According to one embodiment, the bonded abrasive bodies of the embodiments herein can have an improvement in wear rate, such that the abrasive article wears at a rate that is at least 5% less than the wear rate of a conventional metal-bonded abrasive article. According to another embodiment, the wear rate is at least about 8% less, such as at least about 10%, at least about 12%, or even at least about 15% as compared to conventional metal-bonded abrasive articles. In particular instances, the improvement in wear rate can be within a range between about 5% and about 100%, such as on the order of between about 5% and about 75%, between about 5% and about 0%, or even between about 5% and about 50%. It will be appreciated, that such improvements can be achieved on workpieces described herein under the grinding conditions described herein.

Another noteworthy improvement in grinding performance as measured in the industry is wear rate, which is a measure of the wear an abrasive article experiences during grinding. According to one embodiment, the bonded abrasive bodies of the embodiments herein can have an improvement in wear rate, such that the abrasive article wears at a rate that is at least 5% less than the wear rate of a conventional metal-bonded abrasive article. According to another embodiment, the wear rate is at least about 8% less, such as at least about 10%, at least about 12%, or even at least about 15% as compared to conventional metal-bonded abrasive articles. In particular instances, the improvement in wear rate can be within a range between about 5% and about 100%, such as on the order of between about 5% and about 75%, between about 5% and about 60%, or even between about 5% and about 50%. It will be appreciated, that such improvements can be achieved on workpieces described herein under the grinding conditions described herein.

Another noted improvement in grinding performance demonstrated by the abrasive articles of the embodiments herein includes an increase in useable grinding rate. Grinding rate is the speed at which a workpiece can be shaped without sacrificing the surface finish or exceeding the grinding power of the machine or bonded abrasive article. According to one embodiment, the bonded abrasive bodies of the embodiments herein can have an improvement in grinding rate, such that the abrasive article can grind at a rate that is at least 5% faster than a conventional metal-bonded abrasive article. In other instances, the grinding rate can be greater, such as at least about 8% less, at least about 10%, at least about 12%, at least about 15%, at least about 20%, or even at least about 25% as compared to conventional metal-bonded abrasive articles. For certain bonded abrasive articles herein, the improvement in grinding rate can be within a range between about 5% and about 100%, such as on the order of between about 5% and about 75%, between about 5% and about 60%, or even between about 5% and about 50%. It will be appreciated, that such improvements can be achieved on workpieces described herein under the grinding conditions described herein.

Notably, such improvements in the grinding rate can be achieved while maintaining other grinding parameters noted herein. For example, improvements in grinding rate can be achieved while also having limited increase in initial grinding power as noted herein, limited variance in the surface finish as noted herein, and limited wear rate as noted herein.

Figure 12:
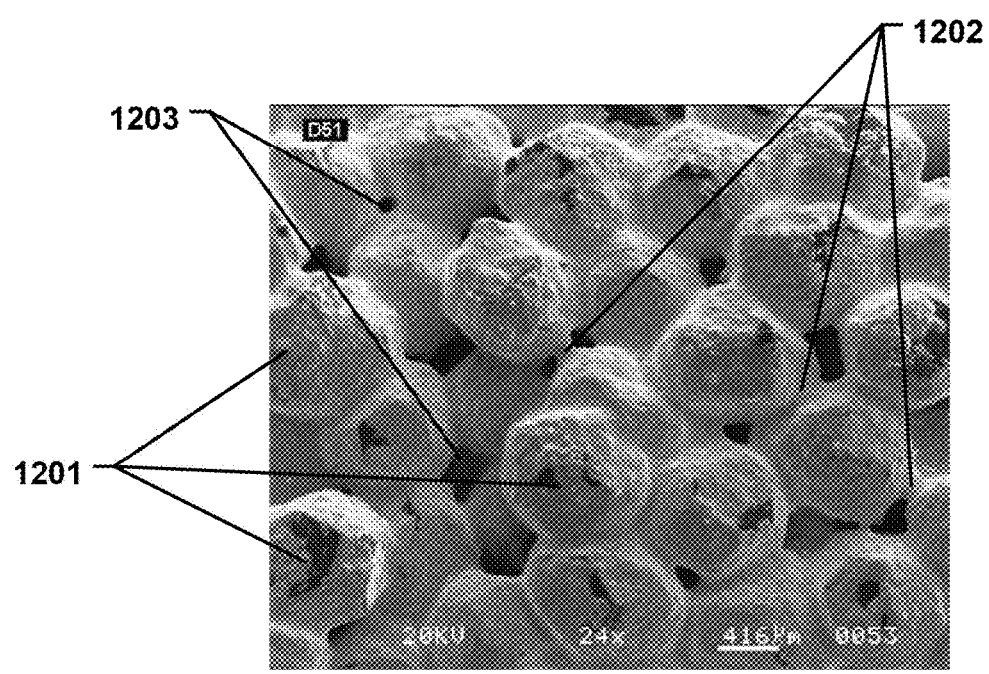
FIG. 12 includes a magnified image of a bonded abrasive body according to an embodiment.

FIG. 12 includes a magnified image of a bonded abrasive body according to an embodiment. As illustrated, the bonded abrasive body includes abrasive grains 1201 contained within and surrounded by a bond material 1202 including a metal or metal alloy material. As further illustrated, the bonded abrasive body has a substantially open structure, including pores 1203 extending between the abrasive grains 1201 and bond material 1202. As evident from FIG. 12, the bonded abrasive body includes a significant amount (vol %) of abrasive grains 1201, such that the structure contains primarily abrasive grains 1201 which are bonded together by the bond material 1202. Moreover, the abrasive grains 1201 are in close proximity to each other, and little bond material 1202 separates the abrasive grains 1201, demonstrating the high ratio of abrasive grains 1201 to bond material 1202.

EXAMPLES

Example 1

A first bonded abrasive sample is made into a 4" diameter wheel having a 1A1 shape as understood in the industry. Forming of the sample includes creating a mixture including 45.96 grams of bronze powder (i.e., 60:40 by weight of copper:tin) having a size of 325 U.S. mesh obtained from Connecticut Engineering Associate Corporation located at 27 Philo Curtis Road, Sandy Hook, Conn. 06482, USA. The bronze powder is dry blended with 5.11 grams of titanium hydride of same size purchased from Chemetall Chemical Products, New Providence N.J., USA. Abrasive grains of cubic boron nitride having a US mesh size −120/+140 are also mixed with the bronze powder and titanium hydride. The abrasive grains are from Saint-Gobain Ceramics and Plastics, Worcester, Mass. and commercially available as CBN-V.

After adding the abrasive grains, 8.15 grams of organic binder is added to the mixture and the mixture is sheared to a consistency of mud. The organic binder includes a thermoplastic resin sold under the brand name S-binder by Wall Colmonoy Co. and a K424 binder from Vitta Corporation. The mixture is then oven dried to remove moisture. The dried mixture is crushed and sieved to obtain agglomerates. The agglomerates are placed into a steel mold having an annular shape and defining an outside nominal diameter of 4 inches and an inside diameter of 3.2 inches. The agglomerates are pressed at 2.4 tons/in² to form a green article. The green article is sintered at 950° C. for 30 minutes in a reducing atmosphere having a pressure of approximately $10^{-4}$ Torr. The finally-formed bonded abrasive has a ratio ($V_{AG}/V_{BM}$) of 3.0 and an amount of porosity (100% interconnected porosity) of 34 volume percent of the total volume of the body.

A steel core is attached to the bonded abrasive body using epoxy and further finished, balanced and speed tested to complete the wheel manufacturing process. The wheel was marked Sample 1 for identification.

Sample 1 is used to grind a workpiece of 52100 bearing steel, originally hardened to 58-62 HRC, in an external cylindrical plunge grinding mode on a Bryant OD/ID grinder. The workpieces are in the form of 52100 steel disks, 4 inches in diameter, and the grinding operation is an external cylindrical plunge grind. Initially, before grinding, Sample 1 is mounted on the machine spindle and trued with a BPR diamond roll, commercially available from Saint-Gobain Abrasives, Arden, N.C., as BPR roll. The truing parameters are shown in Table 1.

TABLE 1

| | |
|---|---|
| Wheel diameter, in | 4 |
| Wheel rpm | 12675 |
| Wheel speed, fpm | 13273 |
| Dresser type | BPR |
| Dresser diameter, in | 5.93 |
| Dresser rpm | 5482 |
| Dress direction | Uni-directional (+) |
| Speed or crush ratio | +0.64 |
| Depth of cut per pass, in | 0.000080 |
| Dresser width, in | 0.012 |
| Dresser traverse feed, in/sec | 1.106 |
| Dresser lead, in/rev | 0.005 |
| Overlap ratio | 2 |

Sample 1 is not dressed with an abrasive stick after truing, as the abrasive grit are sufficiently exposed, reading the abrasive bodies for a non-dressed grinding operation. The grinding parameters are given in Table 2.

TABLE 2

| | |
|---|---|
| Wheel diameter, in | 4 |
| Wheel rpm | 13051 |
| Wheel speed, fpm | 13743 |
| Work diameter, in | 3.7 |
| Work rpm | 168 |
| Work speed, fpm | 163 |
| Wheel to work speed ratio | 84 |
| Equivalent diameter, in | 1.92 |
| Wheel width, in | 0.5 |
| Work width, in | 0.25 |
| Grind width, in | 1.106 |
| Mode of grinding | Plunge |
| Total infeed amount, in | 0.015 |
| Infeed rate, in/sec (Q' = 0.5) | 0.00071 |

TABLE 2-continued

| | |
|---|---|
| Infeed rate, in/sec (Q' = 1.0) | 0.00143 |
| Infeed rate, in/sec (Q' = 2.0) | 0.00286 |

FIG. 1 includes a plot of grinding power (HP/in) versus number of grinding cycles for Sample 1 under the grinding conditions provided in Table 2 at two different material removal rates (MRR') (i.e., 1 in$^3$/min/in and 2 in$^3$/min/in). As demonstrated, plot 101 demonstrates that Sample 1 is capable of grinding the workpiece at a MRR' of 1 in$^3$/min/in at an initial grinding power of 11 Hp/in and a grinding power after 5 consecutive grinding cycles of 10 Hp/in. Plot 103 shows that Sample 1 is capable of grinding the workpiece at a MRR' of 2 in$^3$/min/in at an initial grinding power of 19 Hp/in and a grinding power after 5 consecutive grinding cycles of 16 Hp/in. The power variance for Sample 1 in grinding the workpiece at a MRR' of 1 in$^3$/min/in was 9% and the power variance for Sample 1 in grinding the workpiece at a MRR' of 2 in$^3$/min/in was 16%. Accordingly, Sample 1 demonstrates little variance between an initial grinding power and a steady state grinding power after 5 consecutive grinding operations. The workpiece had a width of approximately 0.25 inches and the abrasive wheel samples were formed to have a width of 0.5 inches. The width used to calculate MRR' was 0.25 inches; the width of the workpiece.

FIG. 1 further includes two plots of grinding power (HP/in) versus number of grinding cycles for a conventional metal bonded abrasive article (Sample MBS1) commonly available as G-Force wheel B181-75UP061 from Saint-Gobain Corporation. As demonstrated, plot 103 demonstrates that Sample MBS1 is capable of grinding the workpiece at an initial grinding power of 40 Hp/in at a MRR' of 1 in$^3$/min/in. After 5 consecutive grinding cycles Sample MBS1 grinds at a power of 10 Hp/in for a MRR' of 1 in$^3$/min/in. Sample MBS1 demonstrates a power variance in a non-dressed grinding operation of 75%.

Plot 104 demonstrates that Sample MBS1 is capable of grinding the workpiece at an initial grinding power of 50 Hp/in at a MRR' of 2 in$^3$/min/in. After 5 consecutive grinding cycles Sample MBS1 grinds at a power of 10 Hp/in for a MRR' of 2 in$^3$/min/in. Sample MBS1 demonstrates a power variance in a non-dressed grinding operation of 84%. Clearly, in a non-dressed grinding operation the bonded abrasive articles of the embodiments herein demonstrate significantly improved performance of grinding power variance over the state-of-the-art abrasive wheels.

Figure 2:
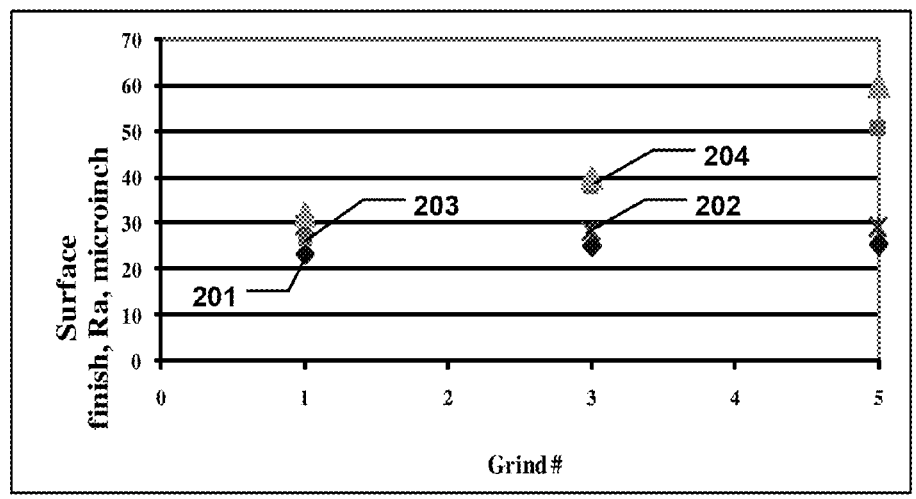
FIG. 2 includes a plot of surface roughness (Ra) versus number of grinding cycles for a bonded abrasive body according to an embodiment.

FIG. 2 includes a plot of surface finish or surface roughness (Ra) versus number of grinding cycles for Sample 1 under the grinding conditions provided in Table 2 at the two different material removal rates (MRR') (i.e., 1 in$^3$/min/in and 2 in$^3$/min/in). As demonstrated, Sample, represented by plots 201 and 202, provides a surface finish (Ra) on the workpiece after consecutive grinding cycles of not greater than about 30 microinches at both material removal rates. Moreover, the variance (i.e., the standard deviation of all measurements) of all measured surface finish values between the initial grinding operation and the fifth grinding cycle does not vary by more than 2.

FIG. 2 further includes surface finish (Ra) versus number of grinding cycles for Sample BMS 1 under the grinding conditions provided in Table 2 at the two different material removal rates (MRR') (i.e., 1 in$^3$/min/in and 2 in$^3$/min/in). As demonstrated by the plots 203 and 204, representing the surface finish achieved by Sample MBS1 at both material removal rates, was initially 30 microinches at both material removal rates, and rose significantly upon further consecutive grinding to values of 50 microinches and about 60 microinches at the material removal rates of 1 in$^3$/min/in and 2 in$^3$/min/in, respectively. The average surface finish for Sample MBS1 at both material removal rates was approximately 40 microinches and the variance in surface finish (standard deviation) was approximately 10 at both material removal rates. Clearly, Sample 1 is capable of providing superior surface finish on the workpiece after consecutive grinding cycles as compared to Sample MBS1.

Example 2

Sample 2 is created using the same process as Sample 1 provided herein. Sample 2 included an amount of fused silica filler material, which was substituted for 25% of the abrasive grain material. The fused silica was of size −120/+140 U.S. mesh and procured from Washington Mills. The finally-formed bonded abrasive has a ratio ($V_P/V_{BM}$) of 2.3 and an amount of porosity (100% interconnected porosity) of 29% volume percent of the total volume of the body.

For comparison, a vitrified CBN wheel of specification B126-M160VT2B was also included in the test as Sample C1. Such a grinding wheel is commonly available from Saint-Gobain Corporation as B126-M160VT2B abrasive wheel.

Figure 3:
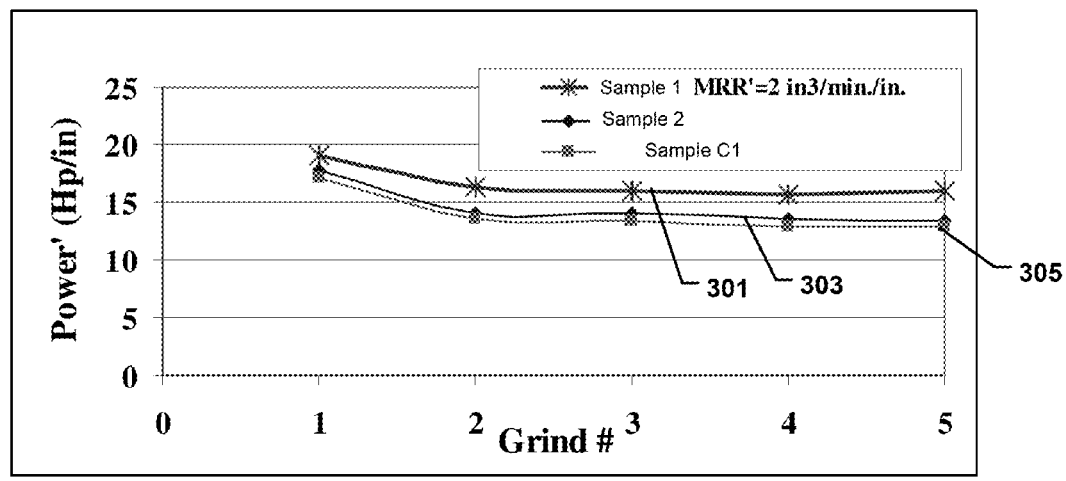
FIG. 3 includes a plot of grinding power (HP/in) versus number of grinding cycles for bonded abrasive bodies according to an embodiment and a conventional sample.

FIG. 3 includes a plot of grinding power (HP/in) versus number of grinding cycles for Sample 1, Sample 2, and Sample C1 the under the grinding conditions provided in Table 2. A material removal rate of 2 in$^3$/min/in is used during grinding. As demonstrated by plot 301, Sample 1 is capable of grinding the workpiece at an initial grinding power of 18 Hp/in and a grinding power after 5 consecutive grinding cycles of 16 Hp/in, for a power variance of approximately 16%. Plot 103 shows that Sample 2 was capable of grinding the workpiece at an initial grinding power of 17 Hp/in and a grinding power after 5 consecutive grinding cycles of 15 Hp/in, for a power variance of approximately 12%. By comparison, the conventional, vitrified bonded abrasive sample had the same change in power as Sample 2, and a power variance of approximately 12%. As such, and quite unexpectedly, Samples 1 and 2, despite being metal-bonded abrasive articles, behave more like a vitrified bonded abrasive article with a brittle bond component and low power variance.

Example 3

A third sample (Sample 3) was made using the same forming processes as Sample 1. The initial mixture is formed using 372 grams of a metal bond composition of 60/40 copper/tin, 41 grams of an active bond composition precursor of titanium hydride, 359 grams of abrasive grains of CBN-V of size B181, 131 grams of filler available as 38A alumina of size 100 mesh from Saint-Gobain Grains and Powders, and 58 grams of the binder used in Example 1. Sample 3 has a ratio ($V_P/V_{BM}$) of 2.5 and porosity of approximately 29 vol %.

Sample 3 is used in a peel grinding operation on an outside diameter of a workpiece made of 4140 steel in the shape of a round bar having a diameter of 5 inches and a length of 11 inches. The workpiece is hardened to 40-45 HRC. Sample 3 is compared to a conventional, vitrified CBN wheel commercially available from Saint Gobain Abrasives as B150-M150-VT2B (Sample C2).

Sample 3 is formed into a large bonded abrasive wheel, mounted on the periphery of a steel disk to form a 20 inch diameter wheel. Sample 3 is trued using a diamond roll and used to grind the workpiece without any subsequent dressings to expose the grit. Truing conditions are shown in Table 3 below. The grinding conditions are shown in Table 4.

TABLE 3

Truing of wheels for Peel grinding of 4140 steel

| | |
|---|---|
| Wheel speed, sfpm | 26,000 |
| Truing direction | Cross-axial, diamond roll perpendicular to wheel axis |
| Truing wheel | Diamond roll, BPR |
| Roll speed, sfpm | 10,200 |
| Depth of cut per pass, in. | 0.0002 |
| Traverse rate, in/rev | 0.015 |
| Roll diameter, in | 4.7 |

TABLE 4

Grinding parameters for Peel grinding of 4140 steel

| | |
|---|---|
| Wheel speed, sfpm | 26,000 |
| Work speed, sfpm | 250 |
| Radial depth of cut, in/pass | 0.008 |
| Roll speed, sfpm | 10,200 |
| Feed rate, in/rev | 0.04 |
| Number of passes | 10 |
| Machine | Weldon 1632 Gold grinder |

Figure 4:
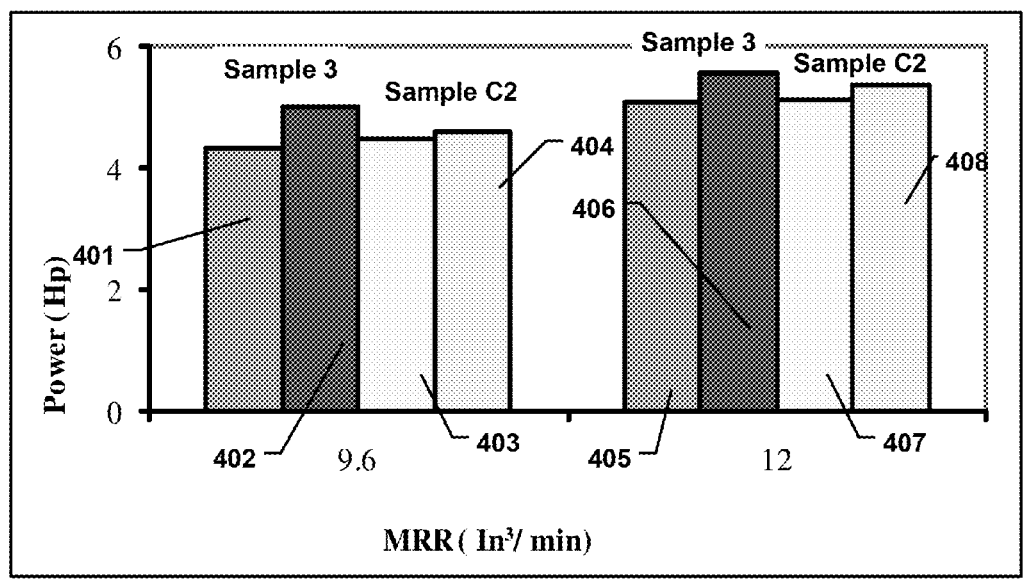
FIG. 4 includes a bar graph of grinding power (Hp) versus two different material removal rates (i.e., 4.5 in$^3$/min/in and 5.1 in$^3$/min/in) for a bonded abrasive body according to an embodiment and a conventional sample.
Figure 5:
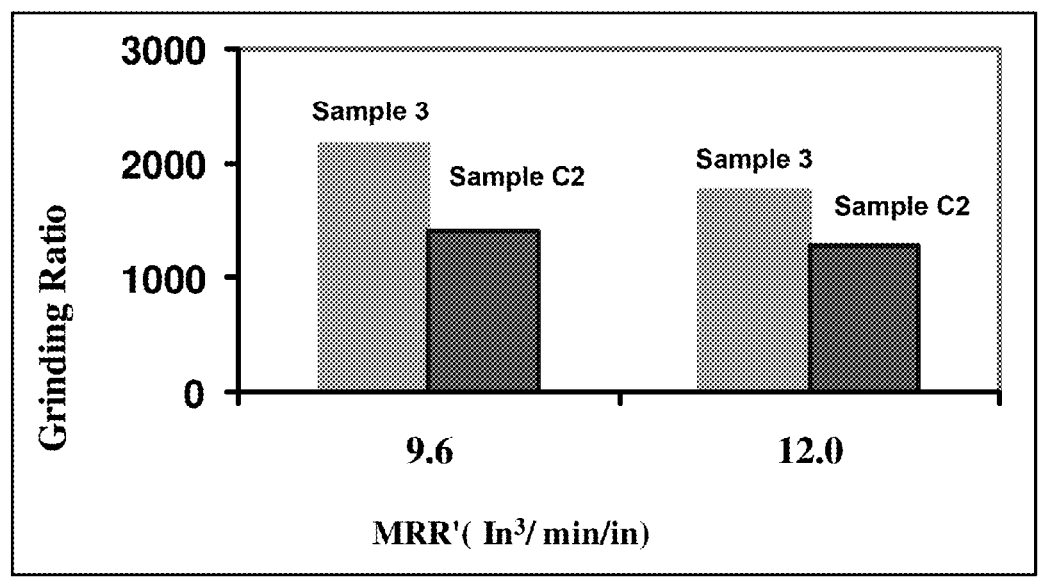
FIG. 5 includes a bar graph of grinding ratio (G-ratio) at two different material removal rates for a bonded abrasive body according to an embodiment and a conventional sample.

The results are summarized in FIGS. 4 and 5. FIG. 4 includes a bar graph of grinding power (Hp) versus two different material removal rates (i.e., 9.6 in³/min/in and 12 in³/min/in). Bar 401 represents the grinding power used during grinding of the workpiece by Sample 3 after an initial pass at a material removal rate of 9.6 in³/min/in. Bar 402 represents the grinding power of Sample 3 during grinding of the workpiece after 25 consecutive grinding cycles (i.e., passes) on the workpiece at the material removal rate of 9.6 in³/min/in. As illustrated, Sample 3 demonstrates a very small change in the grinding power over 25 consecutive grinding cycles without undergoing a truing operation. In fact, the change in grinding power is estimated to be less than about 12%.

Bars 403 and 404 demonstrate the grinding power used during grinding of Sample C2 and after 25 consecutive grinding cycles (i.e., passes) on the workpiece at the material removal rate of 9.6 in³/min/in. In a comparison of Sample 3 with Sample C2, it is noted that Sample 3 behaves more like a vitrified bonded abrasive article than conventional metal bonded abrasive articles.

Bar 405 represents the grinding power used during grinding of the workpiece by Sample 3 after an initial pass at a material removal rate of 12 in³/min/in. Bar 406 represents the grinding power of Sample 3 during grinding of the workpiece after 25 consecutive grinding cycles (i.e., passes) on the workpiece at the material removal rate of 12 in³/min/in. Again, Sample 3 demonstrates a very small change in the grinding power over 25 consecutive grinding cycles without undergoing a truing operation. In fact, the change in grinding power is estimated to be less than about 10%.

Bars 407 and 408 demonstrate the grinding power used during grinding of the workpiece by Sample C2 and at an initial pass and after 25 consecutive grinding cycles (i.e., passes) on the workpiece at the material removal rate of 12 in³/min/in. In a comparison of Sample 3 with Sample C2, it is noted that Sample 3 behaves more like a vitrified bonded abrasive article than conventional metal bonded abrasive articles.

FIG. 5 includes a bar graph of grinding ratio (G-ratio) versus two different material removal rates (i.e., 9.6 in³/min/in and 12 in³/min/in) for Sample 3 and Sample C2. As illustrated, at both material removal rates, Sample 3 has a G-ratio that is significantly greater than Sample C2. In fact, while the spindle power and surface finish were virtually the same for Sample 3 as compared to Sample C2, the G-ratio of the Sample 3 is 35% to 50% greater than the G-ratio of Sample C1 at both material removal rates.

Example 4

A fourth sample (Sample 4) is created according to the processes provided in Example 1. The initial mixture is formed from 138 grams of a metal bond composition of 60/40 copper-tin, 15 grams of titanium hydride as an active bond component precursor, 20 grams of the organic binder of Example 1, and 164 grams of diamonds available from Saint-Gobain Ceramics and Plastics as RB 270/325 U.S. mesh, diamond grits. Sample 4 has a ratio ($V_{AG}/V_{BM}$) of 2.3 and porosity of approximately 36 vol %.

The grinding operation includes fluting of a tungsten carbide workpiece of 1 inches in diameter and 10% by weight of cobalt as binder. The grinding performance of Sample 4 was tested against a state-of-the-art metal bonded wheel (G-Force Abrasive available from Saint-Gobain Corporation) having 18.75 vol % abrasive grains, 71.25 vol % bond, diamond abrasive grains of type RB 270/325 U.S. mesh.

Both samples were trued and dressed off-line before use. The samples were mounted on a steel arbor and balanced. The sample is trued with a silicon carbide wheel of 100 grit, H grade and vitrified bond, commonly used for such processes. The sample is rotated at about ⅒ the surface speed of the silicon carbide wheel that is run at approximately 5000 sfpm. While the sample wheel is rotating, it is trued at 0.001" depth of cut and 10 in/min. traverse rate until the wheel is considered true. Each sample is also dressed with a silicon carbide wheel of 200 mesh to expose the grit for grinding. Dressing with the stick is completed at the beginning of all grinds to start from same reference point.

Figure 6:
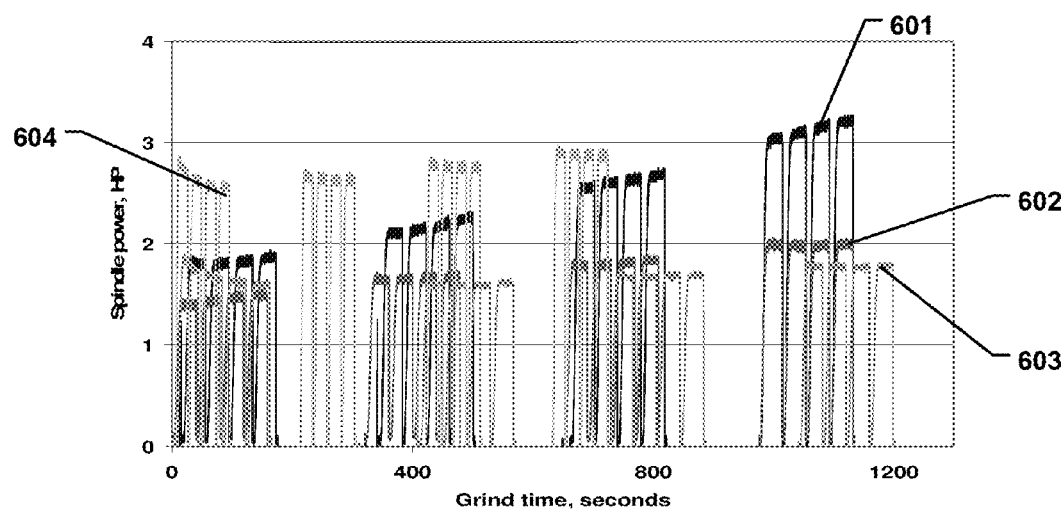
FIG. 6 includes a plot of spindle power (Hp) versus grinding time (sec) for a bonded abrasive body according to an embodiment and a conventional sample.
Figure 7:
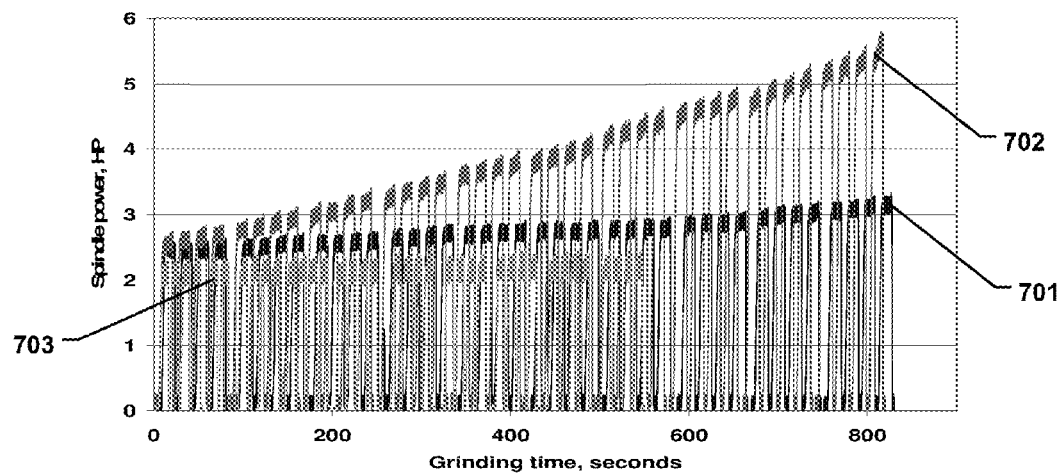
FIG. 7 includes a plot of spindle power (Hp) versus grinding time (sec) for a bonded abrasive body according to an embodiment and a conventional sample.

The results of the grinding test are provided in FIG. 6. FIG. 6 includes a plot of spindle power (Hp) versus grinding time (sec) for Sample 1 under three different conditions and Sample C2 in one condition. Sample C2 is represented by plot 601 and grinding was conducted at a wheel speed of 3000 rpm and a grinding rate of 3.75 inches/min. As illustrated, Sample C2 experienced a significant increase in grinding power necessary for consecutive grinding cycles. The initial grinding power is approximately 1.8 Hp and increases dramatically to 3 Hp over 16 grinding cycles for a duration of approximately 1200 seconds. Sample C2 experienced an increase in grinding power from the threshold grinding power of at least 40%.

By contrast, Sample 4 demonstrated significantly less increase in initial grinding power for various grinding conditions. Plot 602 demonstrates the grinding power of Sample 4 on the workpiece at 3000 rpm and a grinding rate of 3.75 inches/min. The conditions are identical to the grinding conditions used to test Sample C2. As illustrated by plot 602, Sample 4 has a initial grinding power of approximately 1.5 Hp and a final grinding power 2 Hp after 16 consecutive grinding cycles at nearly 1200 seconds. Sample 4 demonstrates an increase in the threshold power of only 25%. Sample 4 demonstrates a significantly improved operable grinding lifetime as compared to Sample C2.

Plot 603 demonstrates the grinding power of Sample 4 on the workpiece at 2500 rpm and a grinding rate of 3.75 inches/min. As illustrated by plot 603, Sample 4 has a initial grinding power of approximately 1.8 Hp and a final grinding power of 1.8 Hp after 16 consecutive grinding cycles over 1200 seconds. Sample 4 demonstrates effectively no increase in the threshold power for all of the grinding cycles demonstrating a significantly improved operable grinding lifetime as compared to Sample C2.

Plot 604 demonstrates the grinding power of Sample 4 on the workpiece at 2500 rpm and a grinding rate of 6.5 inches/min. As illustrated by plot 604, Sample 4 has a initial grinding power of approximately 2.8 Hp and a final grinding power of 1.9 Hp after 16 consecutive grinding cycles at approximately 800 seconds. Sample 4 demonstrates effectively no increase in the threshold power for all of the grinding cycles demonstrating a significantly improved operable grinding lifetime as compared to Sample C2.

In addition to the noted above difference in grinding performance, the bonded abrasive body of Sample 4 (plots 602 and 603) was able to continue grinding 40 flutes in total, which corresponds to 10 parts, before dressing. By contrast, Sample C2 was capable of grinding 16 flutes total, which corresponds to 4 parts total before needing dressing. As such, Sample 4 demonstrates an improvement in grinding efficiency, as measured by parts/dress of approximately 125% over the conventional Sample C2.

Moreover, in a comparison of plots 601 and 604, it is demonstrated that Sample 4 is capable of improved grinding rate over the conventional Sample C2. Under the grinding conditions of plot 604, Sample 4 demonstrated a capability to grind the same number of parts (4 total) in approximately 700 seconds, as compared to Sample C2, which needed approximately 1100 seconds. Accordingly, Sample 4 demonstrated an improvement in grinding time of 300 seconds, corresponding to an improvement of approximately 36% over the conventional Sample C2. Furthermore, based on the feed rate conditions for plots 601 and 604, Sample 4 demonstrated an improvement in grinding rate of 73% (using inches/min) as compared to the conventional Sample C2. Moreover, Sample 4 achieved improved grinding rates while maintaining substantially the same grinding power, while Sample C2 demonstrated a rapid and unsatisfactory increase in grinding power.

Example 5

Sample 4 and Sample C2 are used in a flute grinding operation on a workpiece of 0.5 inch diameter tungsten carbide with 6% cobalt. This type of work material is harder to grind than the workpiece of Example 4 due to higher tungsten carbide content (94 vs 90%) as evidenced by the difference between plots 701 and 702. Plot 701 represent the grinding power for Sample C2 on a workpiece of tungsten carbide having 10% cobalt binder at 3000 rpm and a grinding rate of 6 inches/min for a grinding time of 800 seconds. In fact, plot 701 is the same as plot 601 of FIG. 6. Plot 702 represent the grinding power for Sample C2 on a workpiece of tungsten carbide having 6% cobalt binder, at 3000 rpm and a grinding rate of 6 inches/min for a grinding time of 800 seconds. As illustrated, the power needed to grind the workpiece having 10% cobalt is significantly less than the power needed to grind the workpiece made of tungsten carbide with only 6% cobalt for Sample C2.

By comparison, plot 703 represents the grinding power of Sample 4 conducting a grinding operation on a workpiece of tungsten carbide having only 6% cobalt, at a speed of 2500 rpm at a grinding rate of 8 inches/min for a grinding time of less than 600 seconds. As illustrated, in a comparison of plots 703 and 702, Sample 4 is capable of grinding a greater amount of the tungsten carbide workpiece at a greater rate and more efficiently. That is, Sample 4 experiences significantly less change in grinding power throughout the consecutive grinding cycles as compared to Sample C2.

In further comparison of plots 702 and 703 representing the grinding performance of Sample 4 and Sample C2, respectively, it is noted that Sample 4 also demonstrated improvements in grinding rate. Notably, with little to no increase in the grinding power, Sample 4 required only about 500 seconds to grind the same number of parts as required by Sample C2, which required approximately 800 seconds. Accordingly, Sample 4 achieved an increase in grinding rate of approximately 31% as compared to the conventional Sample C2. Moreover, faster than the time required to grind the same number of parts by Sample C2.

The bonded abrasive bodies herein demonstrate compositions and grinding properties that are distinct from conventional metal-bonded abrasive articles. The grinding properties of the abrasive articles of the embodiments herein are more akin to vitreous bonded abrasive articles than state of the art metal-bonded abrasive articles. The bonded abrasive bodies of the embodiments herein demonstrate improved lifetime of effective grinding, require significantly less dressing than other conventional metal-bonded abrasive bodies, and have improved wear properties as compared to state-of-the-art metal-bonded abrasive bodies. In particular, the bonded abrasive body may not require a separate dressing operation after undergoing a truing operation, which is distinct from conditioning operations of conventional metal-bonded, bonded abrasive articles. That is, it is a typical procedure within the industry to utilize a truing wheel in combination with a dressing stick for resurfacing and sharpening bonded abrasive bodies utilizing metal bond materials. Accordingly, the bonded abrasive bodies of embodiments herein are capable of grinding a greater number of parts per dress, resulting in greater efficiency and longer life as compared to state-of-the-art metal bonded abrasive articles.

Furthermore, particular aspects of the forming process for the bonded abrasive bodies herein are thought to be responsible for certain compositions and microstructural features. The bonded abrasive bodies of embodiments herein include a combination of features, which may be attributed to the forming process and facilitate improved grinding performance, including for example, an active bond composition, particular phases of the active bond composition and particular locations of such phases, type and amount of porosity, type and amount of abrasive grains, type and amount of fillers, ratios of particulate to bond, ratios of abrasive to bond, and mechanical properties (e.g., fracture toughness) of certain components.

In the foregoing, reference to specific embodiments and the connections of certain components is illustrative. It will be appreciated that reference to components as being coupled or connected is intended to disclose either direct connection between said components or indirect connection through one or more intervening components to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure will not be used to interpret or limit the scope or meaning of the claims. In addition, in the foregoing description includes various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments.

What is claimed is:

1. An abrasive article comprising:
a body comprising abrasive grains contained within a bond material comprising a metal, wherein the body comprises a ratio of $V_P/V_{BM}$ of at least about 1.5, wherein $V_P$ is a volume percent of particulate material including abrasive grains and fillers within a total volume of the body and $V_{BM}$ is a volume percent of bond material within the total volume of the body, wherein the body comprises greater than 20 vol % porosity and wherein the bond material comprises an average fracture toughness ($K_{1c}$) of not greater about 4.0 MPa m$^{0.5}$.

2. The abrasive article of claim 1, wherein the bond material comprises an average fracture toughness ($K_{1c}$) within a range between about 0.6 MPa m$^{0.5}$ and about 4.0 MPa m$^{0.5}$.

3. The abrasive article of claim 2, wherein the bond material comprises an average fracture toughness ($K_{1c}$) within a range between about 0.6 MPa m$^{0.5}$ and about 3.0 MPa m$^{0.5}$.

4. The abrasive article of claim 1, wherein the ratio of $V_P/V_{BM}$ is within a range between about 1.5 and about 9.0.

5. The abrasive article of claim 4, wherein the ratio of $V_P/V_{BM}$ is within a range between about 1.7 and about 6.0.

6. The abrasive article of claim 1, wherein the body comprises a ratio of $V_{AG}/V_{BM}$ of at least about 1.3, wherein $V_{AG}$ is a volume percent of abrasive grains within the total volume of the body and $V_{BM}$ is a volume percent of bond material within the total volume of the body.

7. The abrasive article of claim 6, wherein the ratio of $V_{AG}/V_{BM}$ is within a range between about 1.3 and about 9.0.

8. The abrasive article of claim 1, wherein the body comprises an active bond composition comprising at least 1 vol % of an active bond composition of the total volume of the bond material.

9. The abrasive article of claim 8, wherein the active bond composition is present in an amount within a range between about 1 vol % and about 40 vol % of the total volume of the bond material.

10. The abrasive article of claim 1, wherein the body comprises at least 25 vol % porosity.

11. The abrasive article of claim 8, wherein the active bond composition comprises a compound selected from the group consisting of carbides, nitrides, oxides and a combination thereof.

12. The abrasive article of claim 10, wherein the active bond composition comprises a metal element selected from the group of metal elements consisting of titanium, vanadium, chromium, zirconium, hafnium, tungsten, and a combination thereof.

13. The abrasive article of claim 1, wherein a majority of the porosity is interconnected porosity defining a network of interconnected pores extending through the volume of the body.

14. The abrasive article of claim 1, wherein the bond material comprises at least one transition metal element.

15. The abrasive article of claim 14, wherein the bond material comprises a metal selected from the group of metals consisting of copper, tin, silver, molybdenum, zinc, tungsten, iron, nickel, antimony, and a combination thereof.

16. The abrasive article of claim 15, wherein the bond material comprises a metal alloy including copper and tin.

17. The abrasive article of claim 1, wherein the body comprises a bimodal distribution of abrasive grains including fine grains having a fine average grit size and coarse grains having a coarse average grit size, wherein the coarse grit size is greater than the fine average grit size.

18. The abrasive article of claim 1, wherein the fillers comprise a material selected from the group of materials consisting of oxides, carbides, borides, silicides, nitrides, oxynitrides, oxycarbides, silicates, graphite, silicon, intermetallics, ceramics, hollow-ceramics, fused silica, glass, glass-ceramics, hollow glass spheres, and a combination thereof.

19. The abrasive article of claim 1, wherein the fillers comprise a fracture toughness ($K_{1c}$) of not greater than about 10 MPa m$^{0.5}$.

20. The abrasive article of claim 1, wherein the fillers comprise not greater than about 75 vol % of the total volume of the body.

* * * * *